(12) United States Patent
Bowne et al.

(10) Patent No.: US 10,949,925 B2
(45) Date of Patent: *Mar. 16, 2021

(54) SYSTEMS AND METHODS USING A MOBILE DEVICE TO COLLECT DATA FOR INSURANCE PREMIUMS

(71) Applicant: STATE FARM MUTUAL AUTOMOBILE INSURANCE COMPANY, Bloomington, IL (US)

(72) Inventors: Benjamin F. Bowne, Mackinaw, IL (US); Jufeng "James" Peng, Normal, IL (US); Nicholas R. Baker, Normal, IL (US); Duane Lee Marzinik, Springfield, IL (US); Matthew Eric Riley, Heyworth, IL (US); Nick U. Christopulos, Bloomington, IL (US); Brian Mark Fields, Normal, IL (US); J Lynn Wilson, Normal, IL (US); Bryan T. Wilkerson, Bloomington, IL (US); David W. Thurber, Sherman, IL (US)

(73) Assignee: STATE FARM MUTUAL AUTOMOBILE INSURANCE COMPANY, Bloomington, IL (US)

(*) Notice: Subject to any disclaimer, the term of this patent is extended or adjusted under 35 U.S.C. 154(b) by 604 days.

This patent is subject to a terminal disclaimer.

(21) Appl. No.: 15/623,171

(22) Filed: Jun. 14, 2017

(65) Prior Publication Data
US 2017/0287076 A1 Oct. 5, 2017

Related U.S. Application Data

(60) Division of application No. 14/630,738, filed on Feb. 25, 2015, now Pat. No. 10,304,139, which is a
(Continued)

(51) Int. Cl.
G06Q 40/08 (2012.01)
G06Q 10/06 (2012.01)
(Continued)

(52) U.S. Cl.
CPC .............. *G06Q 40/08* (2013.01); *B60W 40/09* (2013.01); *G01C 21/3676* (2013.01);
(Continued)

(58) Field of Classification Search
CPC .............. G06Q 40/08; G06Q 10/0639; G06Q 10/0833; G06Q 30/0283; G06Q 40/04;
(Continued)

(56) References Cited

U.S. PATENT DOCUMENTS

| 5,499,182 A | 3/1996 | Ousborne | 701/29.6 |
| 5,797,134 A | 8/1998 | Mcmillan et al. | 705/400 |

(Continued)

FOREIGN PATENT DOCUMENTS

| CA | 2732634 A1 | 2/2010 | G06F 19/00 |
| CA | 2739300 A1 | 4/2010 | H04W 48/04 |

(Continued)

OTHER PUBLICATIONS

"Driving Style Recognition Using a Smartphone as a Sensor Platform," by Derick A. Johnson and Mohan M. Trivedi. 2011 14th International IEEE Conference on Intelligent Transportation Systems. Washington, DC, USA, Oct. 5-7, 2011. (Year: 2011).*
(Continued)

*Primary Examiner* — Sara C Hamilton

(57) ABSTRACT

A system and method for determining a vehicle insurance premium for a period of time based at least in part on collected vehicle operation data, the system comprising: a mobile device, comprising: one or more sensors associated with the mobile device and configured to automatically collect vehicle operation data during a data collection ses-
(Continued)

sion; a processor; a non-transitory storage medium; a display; a transmitter; and a set of computer readable instructions stored in the non-transitory storage medium and when executed by the processor configured to allow the mobile device to collect vehicle operation data and transmit the collected vehicle operation data; and a remote processing computer, comprising: a server that receives collected vehicle operation data; a database that stores collected vehicle operation data; and a rating engine that determines a vehicle insurance premium based at least in part on collected vehicle operation data.

20 Claims, 18 Drawing Sheets

Related U.S. Application Data continuation of application No. 14/589,564, filed on Jan. 5, 2015, now Pat. No. 9,865,018, which is a continuation of application No. 13/490,166, filed on Jun. 6, 2012, now Pat. No. 8,930,229, which is a continuation of application No. 13/477,793, filed on May 22, 2012, which is a continuation-in-part of application No. 13/172,240, filed on Jun. 29, 2011, now abandoned.

(51) Int. Cl.
*G06Q 10/08* (2012.01)
*B60W 40/09* (2012.01)
*G06Q 40/04* (2012.01)
*G07C 5/08* (2006.01)
*G01S 19/13* (2010.01)
*G06Q 30/02* (2012.01)
*G07C 5/00* (2006.01)
*H04W 4/02* (2018.01)
*G01C 21/36* (2006.01)
*H04W 4/40* (2018.01)
*H04L 29/08* (2006.01)

(52) U.S. Cl.
CPC .......... *G01C 21/3697* (2013.01); *G01S 19/13* (2013.01); *G06Q 10/0639* (2013.01); *G06Q 10/0833* (2013.01); *G06Q 30/0283* (2013.01); *G06Q 40/04* (2013.01); *G07C 5/008* (2013.01); *G07C 5/08* (2013.01); *G07C 5/0858* (2013.01); *H04W 4/026* (2013.01); *H04W 4/40* (2018.02); *H04L 67/12* (2013.01)

(58) Field of Classification Search
CPC ....... H04W 4/40; H04W 4/026; B60W 40/09; G01C 21/3676; G01C 21/3697; G01S 19/13; G07C 5/008; G07C 5/08; G07C 5/0858
USPC .......................................................... 705/4
See application file for complete search history.

(56) References Cited

U.S. PATENT DOCUMENTS

| | | | |
|---|---|---|---|
| 6,067,488 A | 5/2000 | Tano | |
| 6,141,611 A | 10/2000 | Mackey et al. | |
| 6,246,933 B1 | 6/2001 | Bague | |
| 6,298,290 B1 | 10/2001 | Abe et al. | |
| 6,570,609 B1 | 5/2003 | Heien | |
| 6,629,029 B1 | 9/2003 | Giles | 701/31.4 |
| 6,671,650 B2 | 12/2003 | Ogura et al. | 702/152 |
| 6,832,141 B2 | 12/2004 | Skeen et al. | 701/31.4 |
| 7,254,482 B2 | 8/2007 | Kawasaki et al. | |
| 7,324,558 B2 | 1/2008 | Schaller | 370/503 |
| 7,386,376 B2 | 6/2008 | Basir et al. | |
| 7,535,344 B2 | 5/2009 | Obradovich et al. | 340/426.33 |
| 7,565,230 B2 | 7/2009 | Gardner et al. | 701/32.7 |
| 7,659,827 B2 | 2/2010 | Gunderson et al. | 340/576 |
| 7,768,417 B2 | 8/2010 | Choi et al. | 340/686.1 |
| 7,783,505 B2 | 8/2010 | Roschelle et al. | 705/4 |
| 7,865,378 B2 | 1/2011 | Gay | 705/4 |
| 7,881,951 B2 | 2/2011 | Roschelle et al. | 705/4 |
| 7,890,355 B2 | 2/2011 | Gay et al. | 705/4 |
| 7,987,103 B2 | 7/2011 | Gay et al. | 705/4 |
| 7,991,629 B2 | 8/2011 | Gay et al. | 705/4 |
| 8,035,508 B2 | 10/2011 | Breed et al. | 340/539.11 |
| 8,090,598 B2 | 1/2012 | Bauer et al. | 705/4 |
| 8,095,394 B2 | 1/2012 | Nowak et al. | |
| 8,117,049 B2 | 2/2012 | Berkobin et al. | 705/4 |
| 8,140,358 B1 | 3/2012 | Ling et al. | 705/4 |
| 8,140,359 B2 | 3/2012 | Daniel | 705/4 |
| 8,180,522 B2 | 5/2012 | Tuff | 701/33.4 |
| 8,180,655 B1 | 5/2012 | Hopkins, III et al. | 705/4 |
| 8,188,887 B2 | 5/2012 | Catten et al. | 340/905 |
| 8,190,323 B2 | 5/2012 | Maeda et al. | |
| 8,255,243 B2 | 8/2012 | Raines et al. | 705/4 |
| 8,255,244 B2 | 8/2012 | Raines et al. | 705/4 |
| 8,260,489 B2 | 9/2012 | Nielsen et al. | |
| 8,260,639 B1 | 9/2012 | Medina et al. | |
| 8,280,752 B1 | 10/2012 | Cripe et al. | 705/4 |
| 8,311,858 B2 | 11/2012 | Everett et al. | 705/4 |
| 8,314,708 B2 | 11/2012 | Gunderson et al. | 340/576 |
| 8,352,118 B1 | 1/2013 | Mittelsteadt et al. | 701/34.4 |
| 8,355,837 B2 | 1/2013 | Avery et al. | 701/32.8 |
| 8,390,474 B2 | 3/2013 | Yi et al. | 340/870.02 |
| 8,416,067 B2 | 4/2013 | Davidson et al. | 340/426.1 |
| 8,447,231 B2 | 5/2013 | Bai et al. | |
| 8,554,587 B1 | 10/2013 | Nowak et al. | |
| 8,566,126 B1 | 10/2013 | Hopkins, III | |
| 8,718,938 B2 | 5/2014 | Wolf et al. | 701/530 |
| 8,930,229 B2 | 1/2015 | Bowne et al. | 705/4 |
| 8,930,231 B2 | 1/2015 | Bowne et al. | 705/4 |
| 9,293,042 B1 | 3/2016 | Wasserman | |
| 9,672,569 B2 | 6/2017 | Fernandes et al. | |
| 9,672,571 B2 | 6/2017 | Fernandes et al. | |
| 9,697,491 B2 | 7/2017 | Keaveny et al. | |
| 9,865,018 B2 | 1/2018 | Bowne et al. | |
| 9,922,469 B1 | 3/2018 | Ashton et al. | |
| 2001/0005217 A1 | 6/2001 | Hamilton et al. | |
| 2002/0016655 A1 | 2/2002 | Joao | 701/33.4 |
| 2002/0111725 A1 | 8/2002 | Burge | 701/31.4 |
| 2002/0116228 A1 | 8/2002 | Bauer et al. | |
| 2002/0123858 A1 | 9/2002 | Ogura et al. | |
| 2002/0128882 A1 | 9/2002 | Nakagawa et al. | 705/4 |
| 2003/0028298 A1 | 2/2003 | Macky et al. | |
| 2003/0061160 A1 | 3/2003 | Asahina | 705/40 |
| 2003/0163287 A1 | 8/2003 | Vock et al. | 702/187 |
| 2003/0200123 A1 | 10/2003 | Burge et al. | |
| 2004/0039503 A1 | 2/2004 | Doyle | |
| 2004/0111301 A1 | 6/2004 | Wahlbin et al. | |
| 2004/0122639 A1 | 6/2004 | Qiu | |
| 2004/0172173 A1* | 9/2004 | Goto | G01C 21/26 701/1 |
| 2004/0210353 A1 | 10/2004 | Rice | 701/1 |
| 2004/0260579 A1 | 12/2004 | Tremiti | |
| 2005/0259151 A1 | 11/2005 | Hamilton et al. | |
| 2006/0031103 A1 | 2/2006 | Henry | |
| 2006/0053038 A1 | 3/2006 | Warren et al. | |
| 2006/0136291 A1 | 6/2006 | Morita et al. | |
| 2006/0143645 A1 | 6/2006 | Vock et al. | 725/9 |
| 2006/0184295 A1 | 8/2006 | Hawkins et al. | 701/31.4 |
| 2006/0200277 A1 | 9/2006 | Yoshida et al. | 701/1 |
| 2006/0212195 A1 | 9/2006 | Veith et al. | 701/33.4 |
| 2007/0027583 A1 | 2/2007 | Tamir et al. | 701/1 |
| 2007/0027726 A1 | 2/2007 | Warren et al. | 705/4 |
| 2007/0055422 A1 | 3/2007 | Anzai et al. | |
| 2007/0120697 A1 | 5/2007 | Ayoub et al. | 340/686.1 |
| 2007/0132714 A1 | 6/2007 | Nilsson | 345/156 |
| 2007/0132773 A1 | 6/2007 | Plante | |
| 2007/0136107 A1 | 6/2007 | Maguire et al. | 705/4 |
| 2007/0226014 A1 | 9/2007 | Alemayehu et al. | 705/4 |
| 2008/0027761 A1 | 1/2008 | Bracha | |

(56) References Cited

U.S. PATENT DOCUMENTS

| | | | |
|---|---|---|---|
| 2008/0061953 A1 | 3/2008 | Bhogal et al. | |
| 2008/0065427 A1 | 3/2008 | Helitzer et al. | 705/4 |
| 2008/0111666 A1 | 5/2008 | Plante et al. | |
| 2008/0114502 A1 | 5/2008 | Breed et al. | |
| 2008/0120175 A1 | 5/2008 | Doering | 705/14.67 |
| 2008/0126137 A1 | 5/2008 | Kidd et al. | |
| 2008/0147266 A1 | 6/2008 | Plante et al. | |
| 2008/0147267 A1 | 6/2008 | Plante et al. | |
| 2008/0189142 A1 | 8/2008 | Brown et al. | 705/4 |
| 2008/0225000 A1 | 9/2008 | Bellwood et al. | 345/158 |
| 2008/0236929 A1 | 10/2008 | Fukaya et al. | 180/272 |
| 2008/0243558 A1 | 10/2008 | Gupte | 705/4 |
| 2008/0255722 A1 | 10/2008 | Mcclellan et al. | 701/31.4 |
| 2008/0255887 A1 | 10/2008 | Gruter | |
| 2008/0255888 A1* | 10/2008 | Berkobin | G06Q 40/08 705/4 |
| 2008/0258890 A1 | 10/2008 | Follmer et al. | |
| 2008/0262670 A1 | 10/2008 | Mcclellan et al. | 701/31.4 |
| 2008/0270519 A1 | 10/2008 | Ekdahl et al. | 709/203 |
| 2008/0272906 A1 | 11/2008 | Breed | 340/539.11 |
| 2008/0294302 A1 | 11/2008 | Basir | 701/2 |
| 2008/0306996 A1 | 12/2008 | Mcclellan et al. | |
| 2008/0319602 A1 | 12/2008 | Mcclellan et al. | 701/31.4 |
| 2008/0319657 A1 | 12/2008 | Gao | 701/532 |
| 2008/0319665 A1 | 12/2008 | Berkobin | 701/469 |
| 2009/0015684 A1 | 1/2009 | Ooga et al. | |
| 2009/0024273 A1 | 1/2009 | Follmer et al. | 701/33.4 |
| 2009/0024419 A1 | 1/2009 | Mcclellan et al. | 705/4 |
| 2009/0036144 A1 | 2/2009 | Wong et al. | 455/456.3 |
| 2009/0079555 A1 | 3/2009 | Aguirre et al. | 340/441 |
| 2009/0132294 A1 | 5/2009 | Haines et al. | 705/4 |
| 2009/0135509 A1 | 5/2009 | Little et al. | 340/540 |
| 2009/0177382 A1 | 7/2009 | Alles et al. | 701/532 |
| 2009/0192688 A1 | 7/2009 | Padmanabhan et al. | 701/70 |
| 2009/0207005 A1 | 8/2009 | Habetha et al. | |
| 2010/0030540 A1 | 2/2010 | Choi et al. | |
| 2010/0030582 A1 | 2/2010 | Rippel et al. | 705/4 |
| 2010/0030586 A1 | 2/2010 | Taylor et al. | |
| 2010/0030592 A1 | 2/2010 | Evans et al. | 705/5 |
| 2010/0033313 A1 | 2/2010 | Keady et al. | 340/438 |
| 2010/0063850 A1 | 3/2010 | Daniel | 705/4 |
| 2010/0076646 A1 | 3/2010 | Basir et al. | |
| 2010/0131300 A1 | 5/2010 | Collopy et al. | |
| 2010/0131302 A1 | 5/2010 | Collopy et al. | |
| 2010/0131303 A1 | 5/2010 | Collopy et al. | 705/4 |
| 2010/0131304 A1 | 5/2010 | Collopy et al. | 705/4 |
| 2010/0131642 A1 | 5/2010 | Chalikouras et al. | 709/224 |
| 2010/0157061 A1* | 6/2010 | Katsman | G07C 5/008 348/149 |
| 2010/0159952 A1 | 6/2010 | Hanson et al. | 455/456.2 |
| 2010/0205012 A1 | 8/2010 | Mcclellan et al. | 705/4 |
| 2010/0211259 A1 | 8/2010 | Mcclellan | 701/31.4 |
| 2010/0238009 A1 | 9/2010 | Cook et al. | 340/439 |
| 2010/0293033 A1 | 11/2010 | Hall et al. | |
| 2010/0299021 A1 | 11/2010 | Jalili | |
| 2011/0001663 A1* | 1/2011 | Anand | G01S 19/49 342/357.23 |
| 2011/0054767 A1 | 3/2011 | Schafer et al. | 701/119 |
| 2011/0066310 A1 | 3/2011 | Sakai et al. | 701/22 |
| 2011/0072880 A1 | 3/2011 | Avery | 73/1.37 |
| 2011/0077028 A1 | 3/2011 | Wilkes, III et al. | 455/456.3 |
| 2011/0090093 A1 | 4/2011 | Grimm et al. | |
| 2011/0106370 A1 | 5/2011 | Duddle et al. | 701/31.4 |
| 2011/0118934 A1 | 5/2011 | Lowrey et al. | 701/31.5 |
| 2011/0133954 A1 | 6/2011 | Ooshima et al. | |
| 2011/0137684 A1 | 6/2011 | Peak et al. | 705/4 |
| 2011/0140968 A1 | 6/2011 | Bai et al. | |
| 2011/0143319 A1 | 6/2011 | Bennett et al. | 434/14 |
| 2011/0153367 A1 | 6/2011 | Amigo et al. | 705/4 |
| 2011/0161116 A1 | 6/2011 | Peak et al. | 705/4 |
| 2011/0196571 A1 | 8/2011 | Foladare et al. | 701/31.4 |
| 2011/0202225 A1 | 8/2011 | Willis et al. | 701/31.4 |
| 2011/0202305 A1 | 8/2011 | Willis et al. | 702/141 |
| 2011/0213628 A1 | 9/2011 | Peak et al. | 705/4 |
| 2011/0238457 A1 | 9/2011 | Mason et al. | |
| 2011/0258044 A1 | 10/2011 | Kargupta | 705/14.49 |
| 2011/0261270 A1 | 10/2011 | Bang et al. | 348/734 |
| 2011/0295446 A1 | 12/2011 | Basir et al. | |
| 2011/0301839 A1 | 12/2011 | Pudar et al. | 701/408 |
| 2011/0307188 A1 | 12/2011 | Peng et al. | 702/33 |
| 2011/0320492 A1 | 12/2011 | Inghelbrecht | 707/776 |
| 2012/0004933 A1* | 1/2012 | Foladare | G06Q 40/00 705/4 |
| 2012/0010906 A1 | 1/2012 | Foladare et al. | 705/4 |
| 2012/0021386 A1 | 1/2012 | Anderson et al. | 434/66 |
| 2012/0028680 A1 | 2/2012 | Breed | 455/556.1 |
| 2012/0041640 A1 | 2/2012 | Videtich et al. | 701/34.4 |
| 2012/0066007 A1 | 3/2012 | Ferrick et al. | 705/4 |
| 2012/0071151 A1 | 3/2012 | Abramson et al. | 455/418 |
| 2012/0072243 A1* | 3/2012 | Collins | G06Q 10/10 705/4 |
| 2012/0072244 A1 | 3/2012 | Collins et al. | 705/4 |
| 2012/0101855 A1 | 4/2012 | Collins et al. | 705/4 |
| 2012/0109692 A1 | 5/2012 | Collins et al. | 705/4 |
| 2012/0123806 A1 | 5/2012 | Schumann et al. | |
| 2012/0135382 A1 | 5/2012 | Winston et al. | 434/65 |
| 2012/0172055 A1 | 7/2012 | Edge | 455/456.1 |
| 2012/0185204 A1 | 7/2012 | Jallon et al. | 702/141 |
| 2012/0197669 A1 | 8/2012 | Kote et al. | 705/4 |
| 2012/0209516 A1 | 8/2012 | Lee et al. | 701/445 |
| 2012/0215403 A1 | 8/2012 | Tengler et al. | 701/36 |
| 2012/0215641 A1 | 8/2012 | Ohki | 705/14.62 |
| 2012/0235865 A1 | 9/2012 | Nath et al. | 342/451 |
| 2012/0239471 A1 | 9/2012 | Grimm et al. | |
| 2012/0242701 A1 | 9/2012 | Ingrassia, Jr. | 345/649 |
| 2012/0246733 A1 | 9/2012 | Schäfer et al. | 726/26 |
| 2012/0253892 A1 | 10/2012 | Davidson | 705/7.42 |
| 2012/0258702 A1 | 10/2012 | Matsuyama | 455/420 |
| 2012/0259541 A1 | 10/2012 | Downey et al. | 701/433 |
| 2012/0277950 A1 | 11/2012 | Plante et al. | |
| 2012/0330497 A1 | 12/2012 | De Tommasi | 701/33.1 |
| 2013/0006674 A1 | 1/2013 | Bowne et al. | 705/4 |
| 2013/0018677 A1 | 1/2013 | Chevrette | 705/4 |
| 2013/0046510 A1 | 2/2013 | Bowne et al. | 702/187 |
| 2013/0046559 A1 | 2/2013 | Coleman et al. | 705/4 |
| 2013/0046562 A1* | 2/2013 | Taylor | G06Q 40/00 705/4 |
| 2013/0110867 A1 | 5/2013 | Grabau et al. | 707/769 |
| 2013/0116855 A1 | 5/2013 | Nielsen et al. | |
| 2013/0116908 A1 | 5/2013 | Oh et al. | 701/96 |
| 2013/0138460 A1 | 5/2013 | Schumann, Jr. et al. | 705/4 |
| 2013/0151202 A1 | 6/2013 | Denny et al. | |
| 2013/0196681 A1 | 8/2013 | Poduri et al. | 455/456.1 |
| 2013/0218603 A1 | 8/2013 | Hagelstein et al. | |
| 2013/0218604 A1 | 8/2013 | Hagelstein et al. | |
| 2013/0245881 A1 | 9/2013 | Scarbrough | |
| 2013/0289819 A1 | 10/2013 | Hassib et al. | |
| 2013/0295900 A1* | 11/2013 | Hood | H04W 4/40 455/418 |
| 2013/0302758 A1* | 11/2013 | Wright | G07C 5/008 434/65 |
| 2013/0304514 A1 | 11/2013 | Hyde et al. | |
| 2013/0304515 A1 | 11/2013 | Gryan et al. | 705/4 |
| 2013/0317665 A1 | 11/2013 | Fernandes et al. | 701/1 |
| 2013/0317711 A1 | 11/2013 | Plante | |
| 2013/0317865 A1 | 11/2013 | Tofte et al. | |
| 2014/0002651 A1 | 1/2014 | Plante | |
| 2014/0009307 A1 | 1/2014 | Bowers et al. | |
| 2014/0039934 A1 | 2/2014 | Rivera | |
| 2014/0047371 A1 | 2/2014 | Palmer et al. | |
| 2014/0058761 A1 | 2/2014 | Freiberger et al. | 705/4 |
| 2014/0070980 A1 | 3/2014 | Park | |
| 2014/0142989 A1 | 5/2014 | Grosso | 705/4 |
| 2014/0149145 A1 | 5/2014 | Peng et al. | 705/4 |
| 2014/0300739 A1 | 10/2014 | Mimar | 348/148 |
| 2014/0358840 A1 | 12/2014 | Tadic et al. | 706/52 |
| 2015/0046197 A1 | 2/2015 | Peng et al. | 705/4 |
| 2015/0178661 A1 | 6/2015 | Keaveny et al. | 705/7.42 |
| 2015/0332409 A1 | 11/2015 | Menon et al. | 705/4 |
| 2016/0086285 A1 | 3/2016 | Jordan Peters et al. | 705/4 |
| 2016/0086391 A1 | 3/2016 | Ricci | 701/29.3 |
| 2016/0195406 A1 | 7/2016 | Miles et al. | 701/537 |
| 2016/0198306 A1 | 7/2016 | Miles et al. | 455/456.3 |
| 2016/0203560 A1 | 7/2016 | Parameshwaran | 705/4 |

(56) References Cited

U.S. PATENT DOCUMENTS

| | | | |
|---|---|---|---|
| 2017/0132712 A1 | 5/2017 | Bowne et al. | ............ 705/4 |
| 2017/0132713 A1 | 5/2017 | Bowne et al. | ............ 705/4 |
| 2017/0270615 A1 | 9/2017 | Fernandes et al. | |
| 2017/0270617 A1 | 9/2017 | Fernandes et al. | |
| 2017/0287076 A1 | 10/2017 | Bowne et al. | |

FOREIGN PATENT DOCUMENTS

| | | | | |
|---|---|---|---|---|
| CA | 2692960 A1 | 8/2010 | ............ | H04W 24/00 |
| CA | 2752300 A1 | 3/2012 | ............ | G06Q 40/08 |
| CN | 1200248 C | 5/2005 | | |
| CN | 101089556 A | 12/2007 | ............ | G01C 21/00 |
| CN | 202871055 U | 4/2013 | ............ | B60Q 9/00 |
| EP | 700009 A2 | 3/1996 | ............ | G06Q 40/00 |
| GB | 2268608 A | 1/1994 | | |
| JP | 2002259708 A | 9/2002 | ............ | G06Q 20/10 |
| KR | 20110118934 A | 11/2011 | ............ | G01B 11/00 |
| KR | 20140121845 A | 10/2014 | ............ | G07C 5/00 |
| WO | 95/18432 A1 | 7/1995 | ............ | G01C 21/00 |
| WO | 2005/083605 A1 | 9/2005 | ............ | G01C 21/34 |
| WO | 2010/034909 A1 | 4/2010 | ............ | G01P 15/00 |
| WO | 2013/012926 A1 | 1/2013 | ............ | G05D 1/00 |

OTHER PUBLICATIONS

U.S. Non-Final Office Action, U.S. Appl. No. 14/589,618, 33 pages, dated Apr. 20, 2018.
U.S. Final Office Action, U.S. Appl. No. 13/689,014, 74 pages, dated Jan. 24, 2018.
U.S. Final Office Action, U.S. Appl. No. 13/172,240, 49 pages, dated Feb. 2, 2018.
Canadian Office Action, Application No. 2805995, 6 pages, dated Nov. 28, 2018.
Canadian Office Action, Application No. 2805439, 5 pages, dated Dec. 18, 2018.
U.S. Advisory Action, U.S. Appl. No. 13/477,793, 8 pages, dated Jan. 18, 2019.
U.S. Non-Final Office Action, U.S. Appl. No. 15/414,268, 66 pages, dated Feb. 15, 2019.
U.S. Non-Final Office Action, U.S. Appl. No. 15/414,157, 72 pages, dated Feb. 26, 2019.
U.S. Non-Final Office Action, U.S. Appl. No. 15/070,233, 92 pages, dated Mar. 1, 2019.
U.S. Non-Final Office Action, U.S. Appl. No. 15/070,440, 83 pages, dated Mar. 13, 2019.
U.S. Final Office Action, U.S. Appl. No. 13/659,405, 43 pages, dated Jan. 3, 2018.
U.S. Final Office Action, U.S. Appl. No. 15/070,440, 28 pages, dated Jul. 9, 2019.
U.S. Non-Final Office Action, U.S. Appl. No. 13/172,240, 55 pages, dated Sep. 19, 2017.
U.S. Final Office Action, U.S. Appl. No. 15/070,233, 23 pages, dated Jun. 26, 2019.
U.S. Final Office Action, U.S. Appl. No. 14/630,738, 59 pages, dated Nov. 8, 2017.
U.S. Final Office Action, U.S. Appl. No. 13/477,793, 43 pages, dated Nov. 14, 2017.
U.S. Final Office Action, U.S. Appl. No. 14/630,808, 45 pages, dated Jun. 4, 2018.
U.S. Non-Final Office Action, U.S. Appl. No. 13/477,793, 43 pages, dated Jun. 25, 2018.
Genuit, Klaus, "Vehicle Interior Noise—Combination of Sound, Vibration and Interactivity," Sound & Vibrations, URL: www.sandv.com/downloads/0912genu.pdf, pp. 8-12, Dec. 2009.
U.S. Notice of Allowance, U.S. Appl. No. 14/589,564, 18 pages, dated Aug. 9, 2017.
U.S. Non-Final Office Action, U.S. Appl. No. 13/659,405, 58 pages, dated Sep. 6, 2017.
U.S. Non-Final Office Action, U.S. Appl. No. 13/763,231, 38 pages, dated May 22, 2018.
Weiss, Jim et al., "Beginner's Roadmap to Working with Driving Behavior Data," Casualty Actuarial Society E-Forum, Winter—vol. 2, 35 pages, 2012.
U.S. Non-Final Office Action, U.S. Appl. No. 15/070,539, 92 pages, dated May 8, 2019.
U.S. Notice of Allowance, U.S. Appl. No. 14/589,618, 23 pages, dated Jun. 19, 2019.
Canadian Office Action, Application No. 2805475, 5 pages, dated Oct. 1, 2018.
U.S. Final Office Action, U.S. Appl. No. 14/589,618, 31 pages, dated Oct. 19, 2018.
U.S. Final Office Action, U.S. Appl. No. 13/477,793, 36 pages, dated Nov. 6, 2018.
U.S. Final Office Action, U.S. Appl. No. 13/763,231, 28 pages, dated Nov. 15, 2018.
Merriam-Webster, "Definition of Data Processing," 1 pages, Jul. 24, 2017.
U.S. Final Office Action, U.S. Appl. No. 13/763,231, 54 pages, dated Aug. 1, 2017.
U.S. Non-Final Office Action, U.S. Appl. No. 14/630,808, 89 pages, dated Aug. 7, 2017.
U.S. Non-Final Office Action, U.S. Appl. No. 13/659,405, 16 pages, dated Feb. 7, 2013.
U.S. Non-Final Office Action, U.S. Appl. No. 13/490,166, 19 pages, dated Feb. 8, 2013.
U.S. Non-Final Office Action, U.S. Appl. No. 13/763,050, 29 pages, dated Apr. 5, 2013.
U.S. Non-Final Office Action, U.S. Appl. No. 13/763,231, 28 pages, dated May 2, 2013.
U.S. Non-Final Office Action, U.S. Appl. No. 13/689,014, 27 pages, dated May 24, 2013.
U.S. Final Office Action, U.S. Appl. No. 13/659,405, 24 pages, dated May 30, 2013.
U.S. Non-Final Office Action, U.S. Appl. No. 13/172,240, 32 pages, dated Jul. 9, 2013.
U.S. Final Office Action, U.S. Appl. No. 13/490,166, 22 pages, dated Jul. 16, 2013.
U.S. Final Office Action, U.S. Appl. No. 13/763,050, 21 pages, dated Jul. 18, 2013.
European Search Report, Application No. 13167206.5, 7 pages, dated Aug. 23, 2013.
U.S. Final Office Action, U.S. Appl. No. 13/763,231, 27 pages, dated Sep. 17, 2013.
U.S. Final Office Action, U.S. Appl. No. 13/689,014, 29 pages, dated Oct. 25, 2013.
U.S. Final Office Action, U.S. Appl. No. 13/172,240, 34 pages, dated Dec. 6, 2013.
European Extended Search Report, Application No. 13194537.0, 7 pages, dated Apr. 15, 2014.
Scientific and Technical Information Center Search Report, EIC 3600, STIC Database Tracking No. 454715, 39 pages, Jun. 9, 2014.
U.S. Non-Final Office Action, U.S. Appl. No. 13/659,405, 27 pages, dated Jul. 17, 2014.
U.S. Non-Final Office Action, U.S. Appl. No. 13/763,231, 20 pages, dated Jul. 24, 2014.
European Office Action, Application No. 13167206.5, 6 pages, dated Aug. 1, 2014.
Final Office Action, U.S. Appl. No. 13/763,231, 23 pages, dated Nov. 10, 2014.
Non-Final Office Action, U.S. Appl. No. 13/477,793, 20 pages, dated Dec. 31, 2014.
Final Office Action, U.S. Appl. No. 13/659,405, 29 pages, dated Dec. 31, 2014.
Non-Final Office Action, U.S. Appl. No. 13/172,240, 36 pages, dated Jan. 14, 2015.
U.S. Final Office Action, U.S. Appl. No. 13/172,240, 37 pages, dated Aug. 10, 2015.
U.S. Final Office Action, U.S. Appl. No. 13/477,793, 22 pages, dated Aug. 17, 2015.
U.S. Non-Final Office Action, U.S. Appl. No. 13/659,405, 31 pages, dated Sep. 9, 2015.
U.S. Advisory Action, U.S. Appl. No. 13/477,793, 7 pages, dated Nov. 13, 2015.

(56) References Cited

OTHER PUBLICATIONS

U.S. Non-Final Office Action, U.S. Appl. No. 13/763,231, 42 pages, dated Dec. 8, 2015.
U.S. Final Office Action, U.S. Appl. No. 13/659,405, 29 pages, dated Jan. 11, 2016.
U.S. Non-Final Office Action, U.S. Appl. No. 13/172,240, 42 pages, dated Jan. 14, 2016.
U.S. Advisory Action, U.S. Appl. No. 13/659,405, 6 pages, dated Feb. 19, 2016.
U.S. Final Office Action, U.S. Appl. No. 13/172,240, 44 pages, dated Mar. 16, 2016.
U.S. Final Office Action, U.S. Appl. No. 13/763,231, 29 pages, dated Mar. 18, 2016.
U.S. Non-Final Office Action, U.S. Appl. No. 13/477,793, 39 pages, dated May 2, 2016.
U.S. Final Office Action, U.S. Appl. No. 13/763,231, 32 pages, dated Jun. 10, 2016.
U.S. Final Office Action, U.S. Appl. No. 13/477,793, 33 pages, dated Aug. 16, 2016.
U.S. Non-Final Office Action, U.S. Appl. No. 13/659,405, 41 pages, dated Aug. 22, 2016.
U.S. Non-Final Office Action, U.S. Appl. No. 14/589,564, 63 pages, dated Oct. 27, 2016.
European Extended Search Report, Application No. 13189796.9, 9 pages, dated Oct. 31, 2016.
U.S. Final Office Action, U.S. Appl. No. 13/659,405, 42 pages, dated Nov. 15, 2016.
U.S. Non-Final Office Action, U.S. Appl. No. 14/589,618, 24 pages, dated Dec. 29, 2016.
U.S. Non-Final Office Action, U.S. Appl. No. 13/172,240, 38 pages, dated Jan. 6, 2017.
U.S. Non-Final Office Action, U.S. Appl. No. 13/763,231, 55 pages, dated Feb. 14, 2017.
U.S. Final Office Action, U.S. Appl. No. 13/172,240, 48 pages, dated May 9, 2017.
U.S. Final Office Action, U.S. Appl. No. 14/589,618, 37 pages, dated May 9, 2017.
U.S. Final Office Action, U.S. Appl. No. 14/589,564, 49 pages, dated May 9, 2017.
U.S. Non-Final Office Action, U.S. Appl. No. 14/630,738, 80 pages, dated May 12, 2017.
U.S. Non-Final Office Action, U.S. Appl. No. 13/689,014, 76 pages, dated Jul. 13, 2017.
U.S. Non-Final Office Action, U.S. Appl. No. 13/477,793, 51 pages, dated Jul. 17, 2017.
Carroll et al. "Where Innovation is Sorely Needed", http://www.technologyreview.com/news/422568/where-innovation-is-sorely-ne-eded/?nlid, retrieved from the internet on Nov. 4, 2013, 3 pages.
Integrated Vehicle-Based Safety Systems (IVBSS), Research and Innovative Technology Administration (RITA), http://www.its.dot.gov/ivbss/, retrieved from the internet on Nov. 4, 2013, 3 pages.
Ryan, Can having safety features reduce your insurance premiums? (Dec. 15, 2010).
Young et al., "Cooperative Collision Warning Based Highway Vehicle Accident Reconstruction", Eighth International Conference on Intelligent Systems Design and Applications, Nov. 26-28, 2008, pp. 561-565.

* cited by examiner

SYSTEMS AND METHODS USING A MOBILE DEVICE TO COLLECT DATA FOR INSURANCE PREMIUMS

CROSS-REFERENCE TO RELATED APPLICATIONS

This application is a Divisional of U.S. application Ser. No. 14/630,738 filed Feb. 25, 2015, which is a Continuation of U.S. application Ser. No. 14/589,564 filed Jan. 5, 2015, which is a Continuation of U.S. application Ser. No. 13/490,166 filed Jun. 6, 2012, which is a Continuation of U.S. application Ser. No. 13/477,793 filed May 22, 2012, which is a Continuation-in-Part of U.S. application Ser. No. 13/172,240 filed Jun. 29, 2011, the contents of which are hereby incorporated by reference in their entirety.

TECHNICAL FIELD

The present disclosure relates generally to systems and methods for collecting and evaluating driving behavior data and/or driving environment data, and using such data to calculate insurance premiums. Aspects of the data collection, evaluation, and/or premium calculation may be provided by a mobile device, e.g., a smart phone.

BACKGROUND

Improvements in roadway and automobile designs have steadily reduced injury and death rates in developed countries. Nevertheless, auto collisions are still the leading cause of injury-related deaths, an estimated total of 1.2 million worldwide in 2004, or 25% of the total from all causes. Further, driving safety is particularly important for higher-risk drivers such as teens and elderly drivers, as well as higher-risk passengers such as infant and elderly passengers. For example, motor vehicle crashes are the number one cause of death for American teens.

Thus, driving safety remains a critical issue in today's society. Various efforts and programs have been initiated to improve driving safety over the years. For example, driving instruction courses (often referred to as "drivers ed") are intended to teach new drivers not only how to drive, but how to drive safely. Typically, an instructor rides as a passenger and provides instruction to the learning driver, and evaluates the driver's performance. As another example, "defensive driving" courses aim to reduce the driving risks by anticipating dangerous situations, despite adverse conditions or the mistakes of others. This can be achieved through adherence to a variety of general rules, as well as the practice of specific driving techniques. Defensive driving course provide a variety of benefits. For example, in many states, a defensive driving course can be taken as a way to dismiss traffic tickets, or to qualify the driver for a discount on car insurance premiums.

From the perspective of an automobile insurance provider, the provider seeks to assess the risk level associated with a driver and price an insurance policy to protect against that risk. The process of determining the proper cost of an insurance policy, based on the assessed risk level, is often referred to as "rating." The rating process may include a number of input variables, including experience data for the specific driver, experience data for a class of drivers, capital investment predictions, profit margin targets, and a wide variety of other data useful for predicting the occurrence of accidents as well as the amount of damage likely to result from such accidents.

In the industry today, driving behavior data for insurance rating purposes is collected by specialized devices that plug into vehicle data ports. For example, U.S. Pat. No. 6,832,141, issued to Skeen et al., discloses an onboard diagnostic memory module that is configured to plug into the OBD II port. The memory module is preprogrammed with data collection parameters through microprocessor firmware by connection to a PC having programming software for the module firmware. Data is recorded on a trip basis. Intelligent interrogation occurs by interpretive software from an interrogating PC to retrieve a trip-based and organized data set including hard and extreme acceleration and deceleration, velocity (in discrete bands), distance traveled, as well as the required SAE-mandated operating parameters.

SUMMARY

In accordance with the teachings of the present disclosure, a mobile device, such as a smartphone, is used to collect and transmit vehicle operation data, rather than a specialized device that plugs into a vehicle data port.

According to one aspect of the invention, there is provided a system for determining a vehicle insurance premium for a period of time based at least in part on collected vehicle operation data, the system comprising: a mobile device, comprising: one or more sensors associated with the mobile device and configured to automatically collect vehicle operation data during a data collection session; a processor; a non-transitory storage medium; a display; a transmitter; and a set of computer readable instructions stored in the non-transitory storage medium and when executed by the processor configured to allow the mobile device to collect vehicle operation data and transmit the collected vehicle operation data; and a remote processing computer, comprising: a server that receives collected vehicle operation data; a database that stores collected vehicle operation data; and a rating engine that determines a vehicle insurance premium based at least in part on collected vehicle operation data.

A further aspect of the invention provides a system for a method for determining a vehicle insurance premium for a period of time based at least in part on collected vehicle operation data, the method comprising: collecting vehicle operation data via a mobile device while the mobile device is associated with an operating vehicle; transmitting the collected vehicle operation data from the mobile device to a remote computer; and calculating an insurance premium based at least in part on the collected vehicle operation data.

Still another aspect of the invention provides for a method for providing vehicle operation data to a remote computer for calculation of a vehicle insurance premium for a period of time based at least in part on collected vehicle operation data, the method comprising: collecting vehicle operation data via a mobile device while the mobile device is associated with an operating vehicle; and transmitting the collected vehicle operation data from the mobile device to a remote computer.

According to another aspect of the invention, there is provided a method for determining a vehicle insurance premium for a period of time based at least in part on collected vehicle operation data, the method comprising: receiving at a remote computer the collected vehicle operation data from a mobile device; and calculating an insurance premium based at least in part on the collected vehicle operation data.

Another aspect of the invention provides a tangible computer readable storage medium containing instructions that, when executed on by a processor, perform the following steps: collecting vehicle operation data via a mobile device while the mobile device is associated with an operating vehicle; and transmitting the collected vehicle operation data from the mobile device to a remote processing computer.

According to still a further aspect of the invention, there is provided a mobile device comprising: at least one sensor that detects a characteristic of the mobile device selected from distance traveled, location, time, and g-force dynamics; a processor; a tangible computer readable storage medium containing instructions that, when executed on by the processor, perform the following steps: collecting vehicle operation data via the at least one sensor while the mobile device is associated with a vehicle in operation; and transmitting the collected vehicle operation data from the mobile device to a remote processing computer.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Preferred embodiments and their advantages over the prior art are best understood by reference to FIGS. 1-12 below. The present disclosure may be more easily understood in the context of a high level description of certain embodiments.

According to certain embodiments of the invention, a smartphone based telematics technology solution may be implemented that requires no additional hardware or sensing equipment in an insured's vehicle. A mobile device equipped with software may capture and transmit the miles driven and vehicle dynamics (g-force events such as hard stops, sharp turns, fast accelerations, etc.) in an automated fashion. Thus, individual driver's may collect and transmit driving behavior and use information to their insurance company via their mobile device.

Insurance companies may receive, store and use the collected driving behavior and use information to calculate and charge insurance premiums. Software programs operating on insurance company servers may provide a telematics data infrastructure to receive, process, present and transform telematics data for insurance rating purposes.

Insurance customers may be incentivized to provide driving behavior and use information to their insurance company via their mobile device by subsidization of consumers' smartphones and/or smartphone data plan fees through business relationships between insurance providers and wireless data carriers.

A software application ("APP") may be provided for operating systems such as those employed by iPhone, iPad and Android systems. Once the APP is downloaded to the smartphone and launched for initial set up, no additional start/stop activities by the user may be required. The APP may collect data using sensors in the smartphone to determine miles driven, location, time, and vehicle dynamics (g-force events such as hard stops, sharp turns, fast accelerations, etc.).

Computing infrastructure may be provided for receiving telematics data from customer smartphones in real time. The infrastructure may be a cloud computing infrastructure.

In one embodiment of the invention, the APP may utilize sensors in a smartphone to automatically start and stop the application once initially setup on the smartphone. Automated tracking may use algorithms to use the smartphone/server architecture to determine driving, mileage, etc. The APP may turn itself "on" as soon as the smartphone detects that it is in an automobile with its engine running. The smartphone may communicate with the vehicle via Bluetooth to determine that the smartphone is inside the vehicle and that the engine is running. Once detected, the APP may then turn itself on and begin tracking miles driven, location, time, and vehicle dynamics (g-force data). The APP may be configured so that interaction with a driver is limited, such that the APP will run automatically on the smartphone after initial setup, wherein automatic start and stop capabilities may be accomplished using smartphone sensors.

Figure 1:
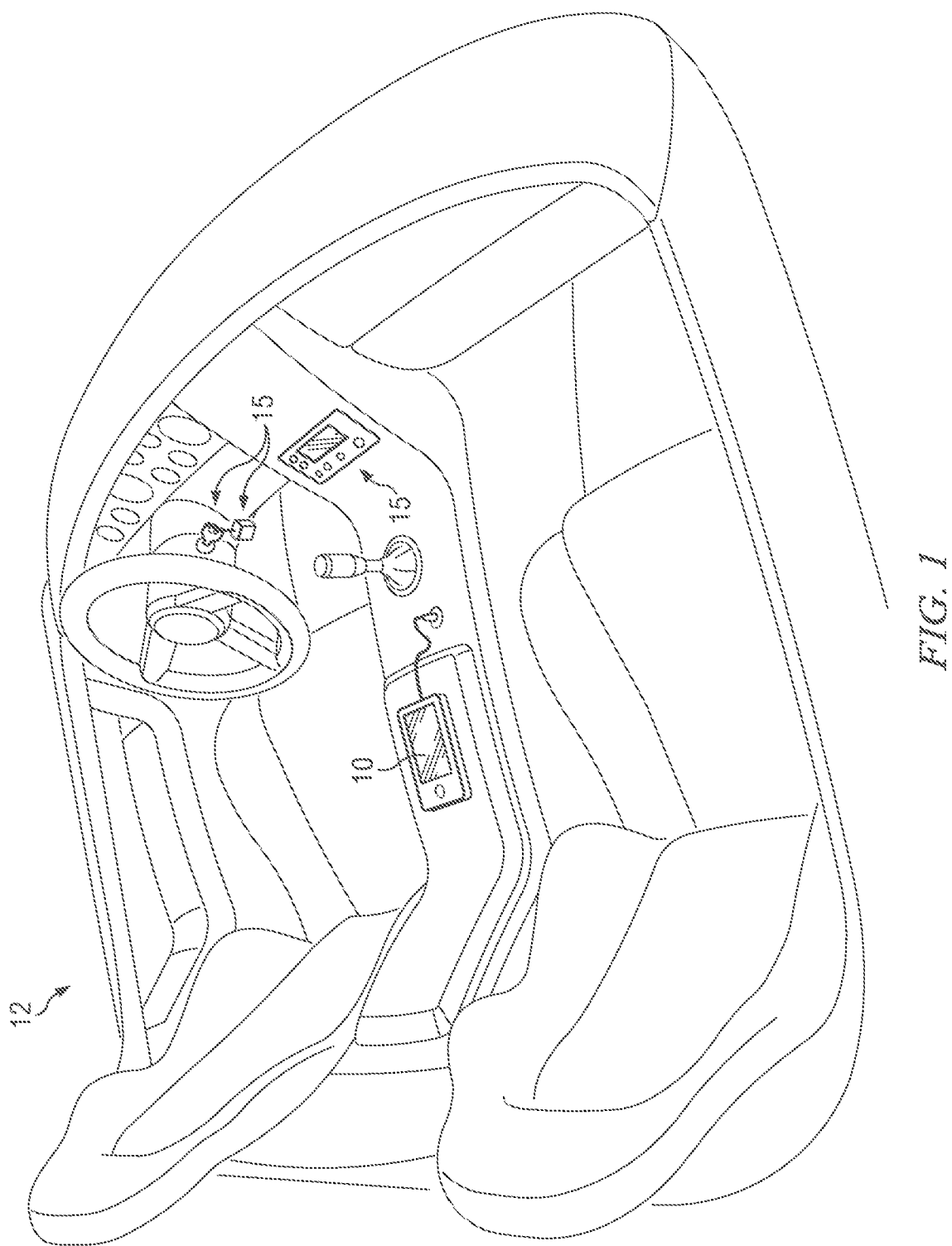
FIG. 1 illustrates an example mobile device located in a vehicle, the mobile device including a driving analysis system, according to certain embodiments of the present disclosure.

FIG. 1 illustrates an example mobile device 10 located in a vehicle 12, according to certain embodiments or implementations of the present disclosure. Mobile device 10 may comprise any type of portable or mobile electronics device, such as for example a smartphone, a cell phone, a mobile telephone, personal digital assistant (PDA), laptop computer, tablet-style computer, or any other portable electronics device. For example, in some embodiments, mobile device 10 may be a smart phone, such as an iPhone by Apple Inc., a Blackberry phone by RIM, a Palm phone, or a phone using an Android, Microsoft, or Symbian operating system (OS), for example. In some embodiments, mobile device 10 may be a tablet, such as an iPad by Apple, Inc., a Galaxy by Samsung, or Eee Pad Transformer by ASUS, and Latitude ST Tablet PC by Dell, for example.

In some embodiments, mobile device 10 may be configured to provide one or more features of a driving analysis system, such as (a) collection of driving data (e.g., data regarding driving behavior and/or the respective driving environment), (b) processing of collected driving data, and/or (c) providing collected driving data and/or processed driving data to a server or database via telecommunication or telematics. Accordingly, mobile device 10 may include one or more sensors, a driving analysis application, a display, and transmitters.

The sensor(s) may collect one or more types of data regarding driving behavior and/or the driving environment. For example, mobile device 10 may include a built-in accelerometer configured to detect acceleration in one or more directions (e.g., in the x, y, and z directions). As another example, mobile device 10 may include a GPS (global positioning system) device or any other device for tracking the geographic location of the mobile device. As another example, mobile device 10 may include sensors, systems, or applications for collecting data regarding the driving environment, e.g., traffic congestion, weather conditions, roadway conditions, or driving infrastructure data. In addition or alternatively, mobile device 10 may collect certain driving data (e.g., driving behavior data and/or driving environment data) from sensors and/or devices external to mobile device 10 (e.g., speed sensors, blind spot information sensors, seat belt sensors, GPS device, etc.).

The driving analysis application ("APP") on mobile device 10 may process any or all of this driving data collected by mobile device 10 and/or data received at mobile device 10 from external sources to calculate one or more driving behavior metrics and/or scores based on such collected driving data. For example, driving analysis application may calculate acceleration, braking, and cornering metrics based on driving behavior data collected by the built-in accelerometer (and/or other collected data). Driving analysis application may further calculate scores based on such calculated metrics, e.g., an overall driving score. As another example, driving analysis application may identify "notable driving events," such as instances of notable acceleration, braking, and/or cornering, as well as the severity of such events. In some embodiments, the driving analysis application may account for environmental factors, based on collected driving environment data corresponding to the analyzed driving session(s). For example, the identification of notable driving events may depend in part on environmental conditions such as the weather, traffic conditions, road conditions, etc. Thus, for instance, a particular level of braking may be identified as a notable driving event in the rain, but not in dry conditions.

The driving analysis application may display the processed data, e.g., driving behavior metrics and/or driving scores. In embodiments in which mobile device 10 includes a GPS or other geographic location tracking device, the application may also display a map showing the route of a trip, and indicating the location of each notable driving event. The application may also display tips to help drivers improve their driving behavior.

The driving analysis application may display some or all of such data on the mobile device 10 itself. In addition or alternatively, the driving analysis application may communicate some or all of such data via a network or other communication link for display by one or more other computer devices (e.g., smart phones, personal computers, etc.). Thus, for example, a parent or driving instructor may monitor the driving behavior of a teen or student driver without having to access the mobile device 10. As another example, an insurance company may access driving behavior data collected/processed by mobile device 10 and use such data for risk analysis of a driver and determining appropriate insurance products or premiums for the driver according to such risk analysis (i.e., performing rating functions based on the driving behavior data collected/processed by mobile device 10).

Figure 2:
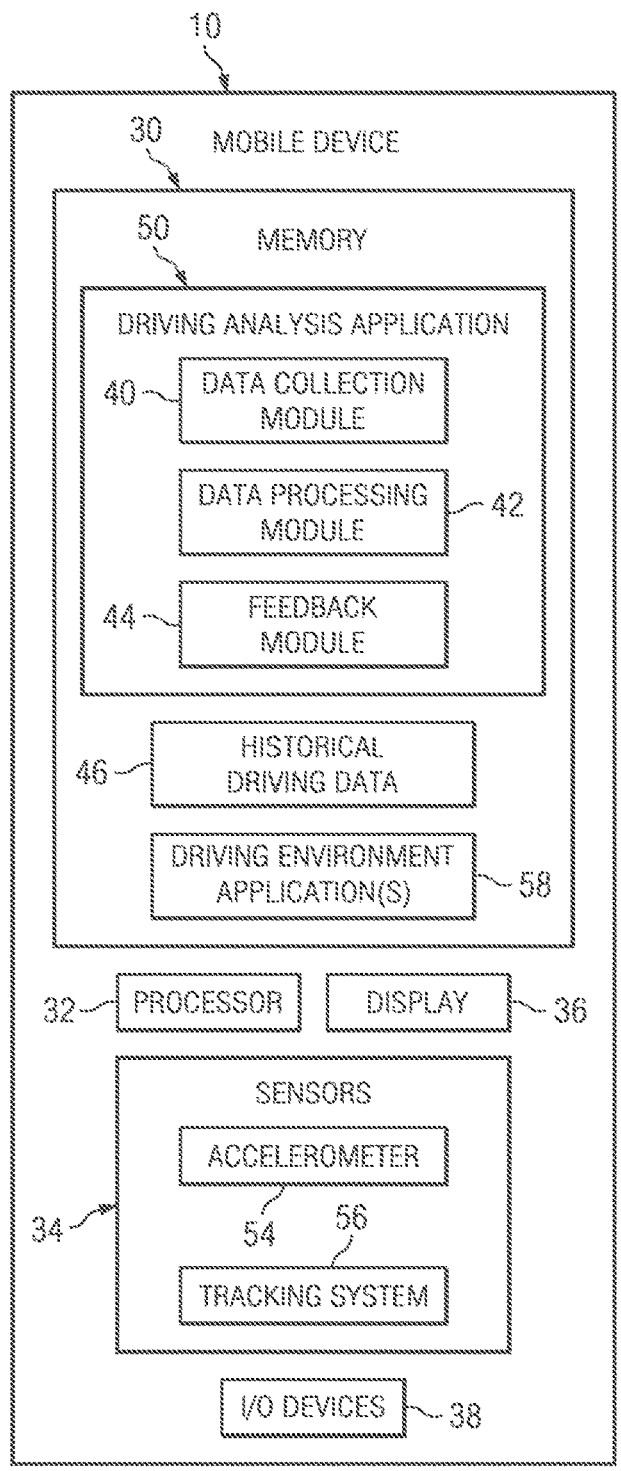
FIG. 2 illustrates example components of the mobile device relevant to the driving analysis system, according to certain embodiments.

FIG. 2 illustrates example components of mobile device 10 relevant to the driving analysis system discussed herein, according to certain embodiments. As shown, mobile device 10 may include a memory 30, processor 32, one or more sensors 34, a display 36, and input/output devices 38.

Memory 30 may store a driving analysis application 50 and historical driving data 46, as discussed below. In some embodiments, memory 30 may also store one or more environmental data applications 58, as discussed below. Memory 30 may comprise any one or more devices suitable for storing electronic data, e.g., RAM, DRAM, ROM, internal flash memory, external flash memory cards (e.g., Multi Media Card (MMC), Reduced-Size MMC (RS-MMC), Secure Digital (SD), MiniSD, MicroSD, Compact Flash, Ultra Compact Flash, Sony Memory Stick, etc.), SIM memory, and/or any other type of volatile or non-volatile memory or storage device. Driving analysis application 50 may be embodied in any combination of software, firmware, and/or any other type of computer-readable instructions.

Application 50 and/or any related, required, or useful applications, plug-ins, readers, viewers, updates, patches, or other code for executing application 50 may be downloaded via the Internet or installed on mobile device 10 in any other known manner.

Processor 32 may include a microprocessor, a microcontroller, a digital signal processor (DSP), an application specific integrated controller (ASIC), electrically-programmable read-only memory (EPROM), or a field-programmable gate array (FPGA), or any other suitable processor(s), and may be generally operable to execute driving analysis application 50, as well as providing any other functions of mobile device 10.

Sensors 34 may include any one or more devices for detecting information regarding a driver's driving behavior and/or the driving environment. For example, as discussed above, sensors 34 may include an accelerometer 54 configured to detect acceleration of the mobile device 10 (and thus, the acceleration of a vehicle in which mobile device 10 is located) in one or more directions, e.g., the x, y, and z directions. As another example, mobile device 10 may include a location tracking system 56, such as a GPS tracking system or any other system or device for tracking the geographic location of the mobile device. A solid state compass, with two or three magnetic field sensors, may provide data to a microprocessor to calculate direction using trigonometry. The mobile device 10 may also include proximity sensors, a camera or ambient light.

Display 36 may comprise any type of display device for displaying information related to driving analysis application 50, such as for example, an LCD screen (e.g., thin film transistor (TFT) LCD or super twisted nematic (STN) LCD), an organic light-emitting diode (OLED) display, or any other suitable type of display. In some embodiments, display 36 may be an interactive display (e.g., a touch screen) that allows a user to interact with driving analysis application 50. In other embodiments, display 36 may be strictly a display device, such that all user input is received via other input/output devices 38.

Input/output devices 38 may include any suitable interfaces allowing a user to interact with mobile device 10, and in particular, with driving analysis application 50. For example, input/output devices 38 may include a touch screen, physical buttons, sliders, switches, data ports, keyboard, mouse, voice activated interfaces, or any other suitable devices.

As discussed above, driving analysis application 50 may be stored in memory 30. Driving analysis application 50 may be described in terms of functional modules, each embodied in a set of logic instructions (e.g., software code). For example, as shown in FIG. 2, driving analysis application 50 may include a data collection module 40, a data processing module 42, and a feedback module 44.

Data collection module 40 may be operable to manage the collection of driving data, including driving behavior data and/or the driving environment data. Data collection module 40 may collect such data from any number and types of data sources, including (a) data sources provided by mobile device 10 (e.g., sensors 34, environmental data application 58), (b) data sources in vehicle 12 but external to mobile device 10 (e.g., on-board vehicle computer, seat belt sensors, GPS system, etc.), and/or (c) data sources external to vehicle 12 (e.g., data sources accessible to mobile device 100 by a satellite network or other telecommunication links). In certain embodiments, the mobile device 10 may communicate with data source in vehicle 12 but external to mobile device 10 via a hardwire connection, Bluetooth® or other wireless means, optical signal transmission, or any other known manner. Sources in vehicle 12 but extended to mobile device 10 may include: engine RPM, speedometer, fuel usage rate, exhaust components or other combination indications, suspension system monitors, seat belt use indicators, tracking systems for other vehicles in vicinity, blind spot indicators.

In some embodiments, data collection module 40 may control the start and stop of driving data collection, e.g., from sources such as accelerometer 54, location tracking system 56, other sensor(s) 34 provided by mobile device 10, or other sensors or sources of driving data external to mobile device 10. In some embodiments or situations, driving data collection is manually started and stopped by the driver or other user, e.g., by interacting with a physical or virtual object (e.g., pressing a virtual "start recording" button) on mobile device 10.

In other embodiments or situations, data collection module 40 may automatically start and/or stop collection of driving data in response to triggering signals received by mobile device 10 from one or more triggering devices 15 associated with vehicle 12 (see FIG. 1). For example, triggering device 15 may include a vehicle on-board computer, ignition system, car stereo, GPS system, a key, key fob, or any other device that may be configured to communicate signals to mobile device 10. Triggering signals may include any signals that may indicate the start or stop of a driving trip. For example, triggering signals may include signals indicating the key has been inserted into or removed from the ignition, signals indicating the ignition has been powered on/off, signals indicating whether the engine is running, signals indicating the radio has been powered on/off, etc. or signals indicating the transmission has been set in a forward gear position. Such triggering device(s) may communicate with mobile device 10 in any suitable manner, via any suitable wired or wireless communications link. As another example, data collection module 40 may automatically start and/or stop collection of driving data in response to determining that the mobile device 10 is likely travelling in an automobile, e.g., based on a real time analysis of data received from accelerometer 54, location tracking system 56, or other sensors 34 provided by mobile device 10. For example, data collection module 40 may include algorithms for determining whether mobile device 10 is likely travelling in an automobile based on data from accelerometer 54 and/or location tracking system 56, e.g., by analyzing one or more of (a) the current acceleration of mobile device 10 from accelerometer 54, (b) the current location of mobile device 10 from location tracking system 56 (e.g., whether mobile device 10 is located on/near a roadway), (c) the velocity of mobile device 10 from location tracking system 56, (d) any other suitable data, or (e) any combination of the preceding.

In some embodiments or situations, data collection module 40 may allow or trigger the start and stop (including interrupting and re-starting) of driving data collection based on the orientation of mobile device 10 (relative to vehicle 12), e.g., based on whether the orientation is suitable for collecting driving data. For example, data collection module 40 may allow driving data collection to be manually or automatically started (or re-started after an interruption). Further, during driving data collection, module 40 may automatically stop or interrupt the driving data collection if mobile device 10 is moved such that it is no longer suitably able to collect driving data.

In some embodiments, data collection module 40 may manage the physical orientation of mobile device 10 relative to the vehicle 12. Module 40 may determine the orientation of mobile device 10 within the vehicle 12 by comparing GPS and position information for the mobile device 10 with GPS and position information for the vehicle 12. This comparison of data may allow the user to adjust the mobile device 10 such that the orientation of mobile device 10 is suitable for collecting driving data. For example, data collection module 40 may determine the orientation of mobile device 10; determine whether the orientation is suitable for collecting driving data; if so, allow data collection to begin or continue; and if not, instruct or notify the user to adjust the orientation of mobile device 10 (e.g., by indicating the direction and/or extent of the desired adjustment). Once mobile device 10 has been adjusted to a suitable orientation for collecting driving data, module 40 may notify the user and allow data collection to begin or continue. Module 40 may continue to monitor the orientation of mobile device 10 relative to the vehicle during the driving data collection session, and if a change in the orientation is detected, interact with the user to instruct a correction of the orientation.

In other embodiments, mobile device 10 is capable of automatically compensating for the orientation of mobile device 10 for the purposes of processing collected driving data (e.g., by data processing module 42), such that data collection may start and continue despite the orientation of mobile device 10, or changes to the orientation of the mobile device 10 relative to the vehicle 12. Module 40 may continue to monitor the orientation of mobile device 10 relative to the vehicle during the driving data collection session, and if a change in the orientation is detected, automatically compensate for the changed orientation of mobile device 10 for processing driving data collected from that point forward. In such embodiments, data processing module 42 may include any suitable algorithms for compensating for the orientation of mobile device 10 (relative to automobile 12) determined by data collection module 40. Such aspects of the invention allow the mobile device to collect accurate g-force data from the sensors of the mobile device regardless of the position of the mobile device in the vehicle. The quality of this data is improved by adjusting the data based on the orientation of the mobile device in the vehicle such as upside down, sideways, in a pocket or in a purse.

As used herein, the term "user" refers to the driver or other person interacting with driving analysis application 50 on mobile device 10.

Data collection module 40 may collect data over one or more data collection sessions corresponding to one or more driving sessions. As used herein, a "driving session" may refer to any period of driving, which may comprise a single uninterrupted trip, a portion of a trip, or a series of multiple distinct trips. A "data collection session" may generally correspond to one driving session, a portion of a driving session, or multiple distinct driving sessions. Further, a data collection session may comprise an uninterrupted period of data collection or may include one or more interruptions (e.g., in some embodiments, if mobile device 10 is moved out of proper orientation for data collection). Thus, in some embodiments, each interruption of data collection initiates a new data collection session; in other embodiments, e.g., where a data collection session generally corresponds to a driving trip, an interrupted data collection session may reconvene after the interruption.

Thus, based on the above, data collection module 40 may trigger or control the start and stop of data collection sessions and/or start and the stop of interruptions within a data collection session.

Any or all data collected by data collection module 40 may be time stamped (e.g., time and date), either by data collection module 40 itself or by another device that collected or processed particular data before sending the data to data collection module 40. The time stamping may allow for data from different sources (e.g., data from accelerometer 54, location tracking system 56, a seat belt sensor, etc.) to be synchronized for analyzing the different data together as a whole (e.g., to provide the driving context for a particular reading of accelerometer 54, as discussed below).

Data collection module 40 may collect data corresponding to physical parameters or characteristics of the vehicle.

Data processing module 42 may be operable to process or analyze any of the driving data (e.g., driving behavior data and/or the driving environment data) collected by mobile device 10 itself and/or collected by external devices and communicated to mobile device 10, and based on such collected driving data, calculate one or more driving behavior metrics and/or scores. For example, data processing module 42 may calculate the driving behavior metrics of acceleration, braking, and/or cornering metrics based on driving behavior data collected by an accelerometer 54, location tracking system 56, and/or other collected data. Further, data processing module 42 may calculate one or more driving scores based on the calculated driving behavior metrics (e.g., acceleration, braking, cornering, etc.) and/or based on additional collected data, e.g., driving environment data collected by environmental data applications 58. For example, data processing module 42 may apply algorithms that calculate a driving score based on weighted values for each respective driving behavior metric, and environmental correction values based on the relevant driving environment data, such as weather, traffic conditions, road conditions, etc.

Data processing module 42 may calculate individual driving behavior metrics (e.g., acceleration, braking, cornering, etc.) and/or driving scores for individual data collection sessions. Similarly, data processing module 42 may calculate driving behavior metrics and/or driving scores corresponding to a group of data collection sessions, which may be referred to as group-session metrics/scores. Data processing module 42 may calculate group-session metrics/scores may using averaging, filtering, weighting, and/or any other suitable algorithms for determining representative metrics/scores corresponding to a group of data collection sessions. A "group" of data collection sessions may be specified in any suitable manner, for example:

The n most recent data collection sessions;

The n most recent data collection sessions corresponding to one or more specific driving conditions or other preset conditions, such as for example: nighttime driving, daytime driving, driving within specific times of day (e.g., specific hours), weekend driving, weekday driving, highway driving, city driving, rush-hour driving, good-weather driving, bad-weather driving, driving in specific weather conditions (e.g., rain, snow, etc.), trips of specified distances (e.g., trips shorter than a threshold distance, longer than a threshold distance, or within any present range of distances, trips associated with a certain geographic area (e.g., trips within or near a specific city), trips between specific points (e.g., trips between the driver's home and work, which may be determined for example by GPS data or entered into application 50 by the driver), trips following a specific route (e.g., which may be determined for example by GPS data or entered into application 50 by the driver), driving alone (e.g., which status may be entered into application 50 by the driver), driving with passengers (e.g., which status may be entered into application 50 by the driver), All data collection sessions within a specified time period, e.g., all data collection sessions in the last day, week, 30 days, 90 days, year, or any other specified time period.

All data collection sessions within a specified time period that also correspond to one or more specific driving conditions or other preset conditions, e.g., any of the conditions listed above.

All data collection sessions after a particular starting point, e.g., all data collection sessions after a user initiates application 50, or after a user resets a particular average or filtered metric/score (or all average or filtered metrics/scores).

All data collection sessions within a specified time period that also correspond to one or more specific driving conditions or other preset conditions, e.g., any of the conditions listed above.

All data collection sessions related to a particular driver.

Any combination or variation of any of the above.

The number n may be any multiple number (2, 3, 4, 5, etc.), which may be automatically determined by application 50, selected by a user, or otherwise determined or selected. Further, as mentioned briefly above, data processing module 42 may identify "notable driving events," such as instances of notable acceleration, braking, and cornering, as well as the severity of such events. Data processing module 42 may identify notable driving events using any suitable algorithms. For example, an algorithm may compare acceleration data from accelerometer 54 (raw or filtered) to one or more predefined thresholds for notable acceleration, braking, or cornering. In some embodiments, data processing module 42 may analyze the acceleration data in combination with contextual data, which may provide a context for the acceleration data, and analyze the acceleration data based on the context data. Thus, for example, particular acceleration data may or may not indicate "notable acceleration" depending on the contextual data corresponding (e.g., based on time stamp data) to the particular acceleration data being analyzed. Data processing module 42 may utilize algorithms that analyze the acceleration data together with the relevant contextual data.

Contextual data may include, for example, location data and/or driving environment data. Module 42 may use location data (e.g., from location tracking system 56) in this context to determine, for example, the type of road the vehicle is travelling on, the speed limit, the location of the vehicle relative to intersections, traffic signs/light (e.g., stop signs, yield signs, traffic lights), school zones, railroad tracts, traffic density, or any other features or aspects accessible from location tracking system 56 that may influence driving behavior. Module 42 may use driving environment data (e.g., from environmental data applications 58) in this context to determine, for example, the relevant weather, traffic conditions, road conditions, etc.

In some embodiments, data processing module 42 may apply different thresholds for determining certain notable driving events. For example, for determining instances of "notable cornering" based on acceleration data from accelerometer 54 and weather condition data (e.g., from sensors on the vehicle, sensors on mobile device 10, data from an online weather application (e.g., www.weather.com), or any other suitable source), module 42 may apply different thresholds for identifying notable cornering in dry weather conditions, rainy weather conditions, and icy weather conditions. As another example, for determining instances of "notable braking" based on acceleration data from accelerometer 54 and location data (e.g., from a GPS system), module 42 may apply different thresholds for identifying notable braking for highway driving, non-highway driving, low-traffic driving, high-traffic driving, approaching a stop sign intersection, approaching a stop light intersection, etc.

Further, in some embodiments, data processing module 42 may define multiple levels of severity for each type (or certain types) of notable driving events. For example, module 42 may define the following levels of notable braking: (1) significant braking, and (2) extreme braking. As another example, module 42 may define the following three progressively severe levels of particular notable driving events: (1) caution, (2) warning, and (3) extreme. Each level of severity may have corresponding thresholds, such that the algorithms applied by module 42 may determine (a) whether a notable event (e.g., notable braking event) has occurred, and (b) if so, the severity level of the event. Each type of notable driving event may have any number of severity levels (e.g., 1, 2, 3, or more).

In some embodiments, data processing module 42 may calculate the number of each type of notable driving events (and/or the number of each severity level of each type of notable driving event) for a particular time period, for individual data collection sessions, or for a group of data collection sessions (e.g., using any of the data collection session "groups" discussed above).

Environmental data applications 58 may comprise any applications or interfaces for collecting driving environment data regarding the driving environment corresponding to a driving data collection session. For example, environmental data applications 58 may comprise any applications or interfaces operable to collect data from one or more sensors on vehicle 12 or from one or more devices external to vehicle 12 (via a network or communication links) regarding the relevant driving environment. For example, such driving environment data may include any of (a) traffic environment characteristics, e.g., congestion, calmness, or excitability of traffic, quantity and type of pedestrian traffic, etc., (b) weather environment characteristics, e.g., ambient temperature, precipitation, sun glare, darkness, etc., (c) roadway environment characteristics, e.g., curvature, skid resistance, elevation, gradient and material components, etc., (d) infrastructure environment characteristics, e.g., lighting, signage, type of road, quantity and type of intersections, lane merges, lane markings, quantity and timing of traffic lights, etc., and/or (e) any other type of driving environment data.

According to some embodiments of the invention, data collection module 40 collects information and data sufficient to enable the data processing module 42 to analyze how driving has impacted fuel efficiency. The feedback module 44 may report notable driving events that had positive or negative impact on the fuel efficiency of the vehicle 12. For example, if the vehicle 12 has a normal transmission and the driver allows the engine to reach excessive RPMs before shifting to a higher gear, each occurrence may be reported as a notable driving event that impacts fuel efficiency. The feedback may assist the driver to develop driving habits that enable more fuel efficient vehicle operation.

Feedback module 44 may be operable to display any data associated with application 50, including raw or filtered data collected by data collection module 40 and/or any of the metrics, scores, or other data calculated or proceed by data processing module 42. For the purposes of this description, unless otherwise specified, "displaying" data may include (a) displaying data on display device 36 of mobile device 10, (b) providing audible feedback via a speaker of mobile device 10, providing visual, audible, or other sensory feedback to the driver via another device in the vehicle (e.g., through the vehicle's radio or speakers, displayed via the dashboard, displayed on the windshield (e.g., using semi-transparent images), or using any other known techniques for providing sensory feedback to a driver of a vehicle, (d) communicating data (via a network or other wired or wireless communication link or links) for display by one or more other computer devices (e.g., smart phones, personal computers, etc.), or (e) any combination of the preceding. To provide feedback to the driver visual, audible, or other sensory feedback to the driver via a feedback device in the vehicle other than mobile device 10, mobile device 10 may include any suitable communication system for wired or wireless communication of feedback signals from mobile device 10 to such feedback device.

Further, feedback module 44 may also initiate and/or manage the storage of any data associated with application 50, including raw or filtered data collected by data collection module 40 and/or any of the metrics, scores, or other data calculated or proceed by data processing module 42, such that the data may be subsequently accessed, e.g., for display or further processing. For example, feedback module 44 may manage short-term storage of certain data (e.g., in volatile memory of mobile device 10), and may further manage long-term storage of certain data as historical driving data 46 (e.g., in non-volatile memory of mobile device 10). As another example, feedback module 44 may communicate data associated with application 50 via a network or other communication link(s) to one or more other computer devices, e.g., for display by remote computers 150 and/or for storage in a remote data storage system 152, as discussed in greater detail below with reference to FIG. 5.

Feedback module 44 may be operable to display metrics, scores, or other data in any suitable manner, e.g., as values, sliders, icons (e.g., representing different magnitudes of a particular metric/score value using different icons or using different colors or sizes of the same icon), graphs, charts, etc. Further, in embodiments in which mobile device 10 includes a GPS or other location tracking system 56, feedback module 44 may display one or more maps showing the route travelled during one or more data collection sessions or driving sessions, and indicating the location of "notable driving events." Notable driving events may be identified on the map in any suitable manner, e.g., using representative icons. As an example only, different types of notable driving events (e.g., notable acceleration, notable braking, and notable cornering) may be represented on the map with different icons, and the severity level of each notable driving event may be indicated by the color and/or size of each respective icon.

Feedback module 44 may also display tips to help drivers improve their driving behavior. For example, feedback module 44 may analyze the driver's driving behavior metrics and/or driving scores to identify one or more areas of needed improvement (e.g., braking or cornering) and display driving tips specific to the areas of needed improvement.

In some embodiments, feedback module 44 may provide the driver real time feedback regarding notable driving events, via any suitable form of feedback, e.g., as listed above. For example, feedback module 44 may provide audible feedback (e.g., buzzers or other sound effects, or by human recorded or computer-automated spoken feedback) through a speaker of mobile device 10 or the vehicle's speakers, or visual feedback via display 36 of mobile device 10 or other display device of the vehicle. Such real-time audible or visual feedback may distinguish between different types of notable driving events and/or between the severity level of each notable driving event, in any suitable manner. For example, spoken feedback may indicate the type and severity of a notable driving event in real time. Non-spoken audible feedback may indicate the different types and severity of notable driving events by different sounds and/or different volume levels.

Feedback module 44 may manage user interactions with application 50 via input/output devices 38 (e.g., a touch screen display 36, keys, buttons, and/or other user interfaces). For example, feedback module 44 may host a set or hierarchy of displayable objects (e.g., screens, windows, menus, images etc.) and facilitate user navigation among the various objects. An example set of displayable objects, in the form of screens, is shown and discussed with reference to FIGS. 6A-6G.

In some embodiments, feedback module 44 may generate a series of user-navigable screens, windows, or other objects for display on display device 36 on mobile device 10. FIGS. 6A-6G illustrate example screen shots generated by driving analysis application 50 on an example mobile device 10, according to certain embodiments.

Figure 6A:
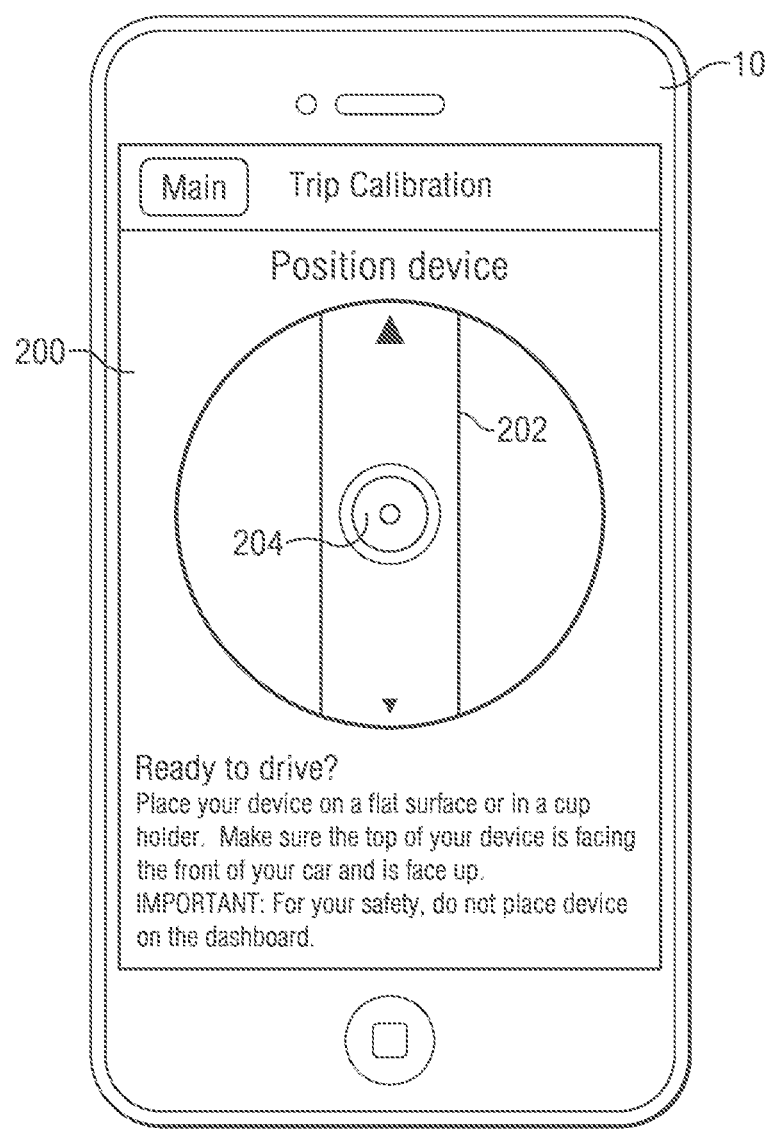
FIGS. 6A-6G illustrate example screen shots generated by an example driving analysis application on a mobile device, according to certain embodiments.

FIG. 6A illustrates an example screenshot of a screen 200 of a device orientation feature provided by application 50 for assisting a user with the proper alignment or orientation of mobile device 10 within the automobile or vehicle. In this example, an alignment image 202 may indicate the physical orientation (e.g., angular orientation) of mobile device 10 relative to the automobile. For example, alignment image 202 may rotate relative to the rest of the display as mobile device 10 is reoriented. Alignment image 202 may include arrows or other indicators to assist the use in orienting mobile device 10. An indicator 204 (e.g., a lighted icon) may indicate when mobile device 10 is suitably oriented for data collection, e.g., with the front of mobile device 10 facing toward the front of the automobile or vehicle.

In embodiments requiring manual starting of data recording (i.e., starting a data collection session), a screen or image for starting data recording may appear upon the mobile device 10 being properly oriented. Thus, data collection module 40 may then start (or re-start) collection of driving data upon a manual instruction (e.g., a user pressing a "Start Recording" button that is displayed on display 36 once mobile device 10 is properly oriented).

In embodiments that provide for automatic starting of data recording (i.e., starting a data collection session), data collection module 40 may start (or re-start) driving data collection automatically upon the proper orientation of mobile device 10, or automatically in response to an automatically generated triggering signal (assuming mobile device 10 is properly oriented).

Figure 6C:
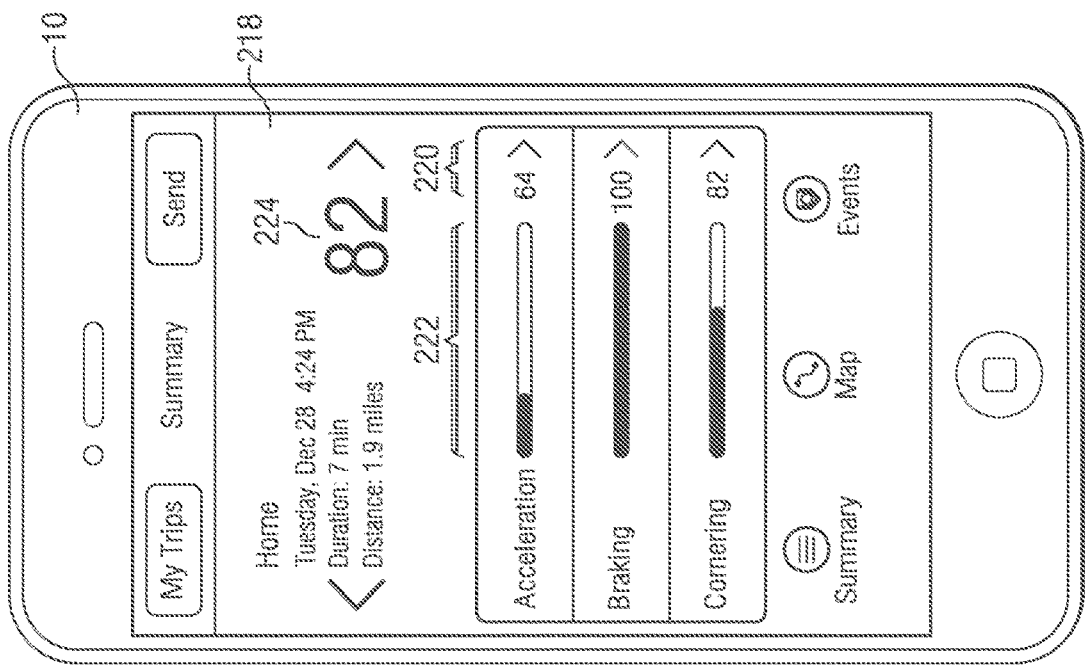
Figure 6B:
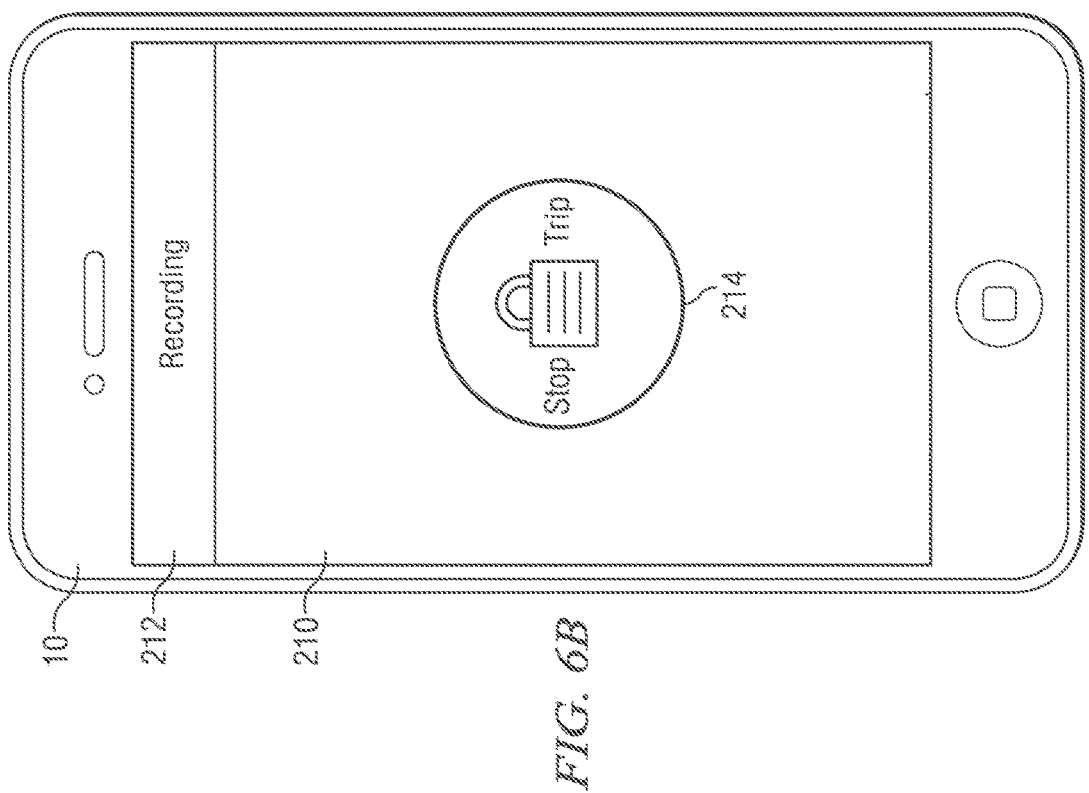

FIG. 6B illustrates an example screenshot of a screen 210 during a data collection session. The display may indicate that driving data is being recorded (image 212) and may provide a selectable image 214 for stopping the recording of driving data (i.e., ending the data collection session).

FIG. 6C illustrates an example screenshot of a summary screen 218 for a single data collection session, including three driving behavior metrics (Acceleration, Braking, and Cornering) and a driving score ("224") calculated by data processing module 42 for the single data collection session. For the illustrated data collection session, the driving score 224 calculated to be "82." The metrics and score may be displayed in real time (e.g., evaluating the driving behavior during an ongoing trip), after conclusion of a trip (e.g., evaluating the completed trip or a group of trips), or at any other time. As shown, screen 218 includes values 220 and corresponding bar graphs 222 indicating the Acceleration, Braking, and Cornering metrics, as well a visual representation 224 of the driving score ("82") calculated by data processing module 42. The driving score may be calculated based on the Acceleration, Braking, and Cornering metrics using any suitable algorithm. For example, the driving score may be a straight or weighted average of the metrics, a sum or weighted sum of the metrics, or any other representation. The algorithm for calculating the driving score may also account for data other than the metrics, such as the identity of the driver, the time, duration, and/or distance of the data collection session, the weather conditions, traffic conditions, and/or any other relevant data accessible to data processing module 42.

Figure 6E:
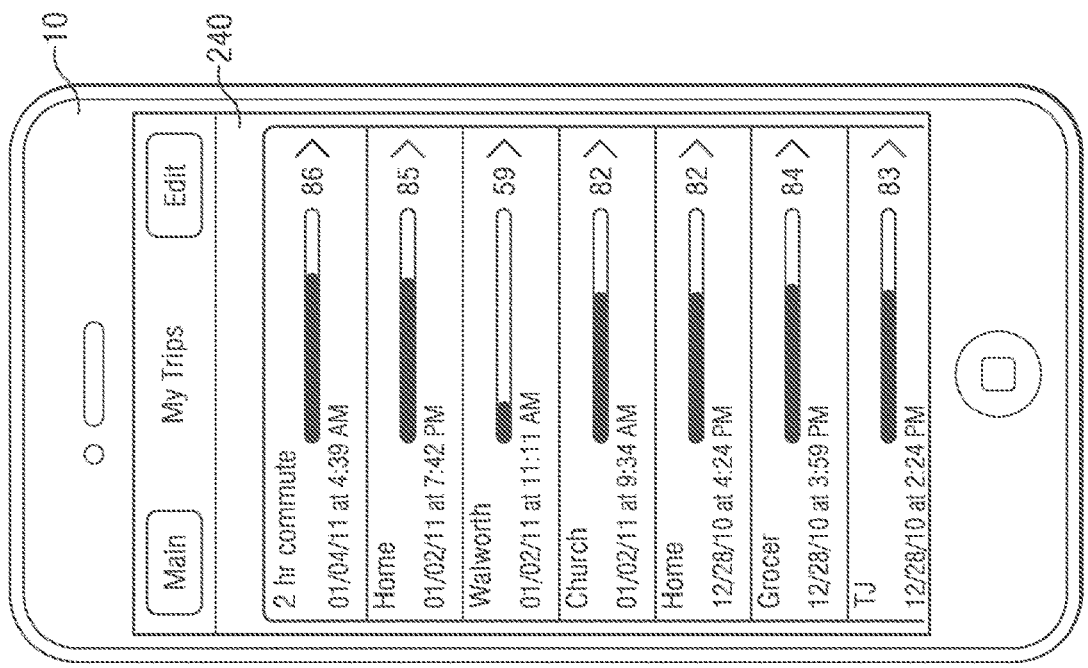
Figure 6D:
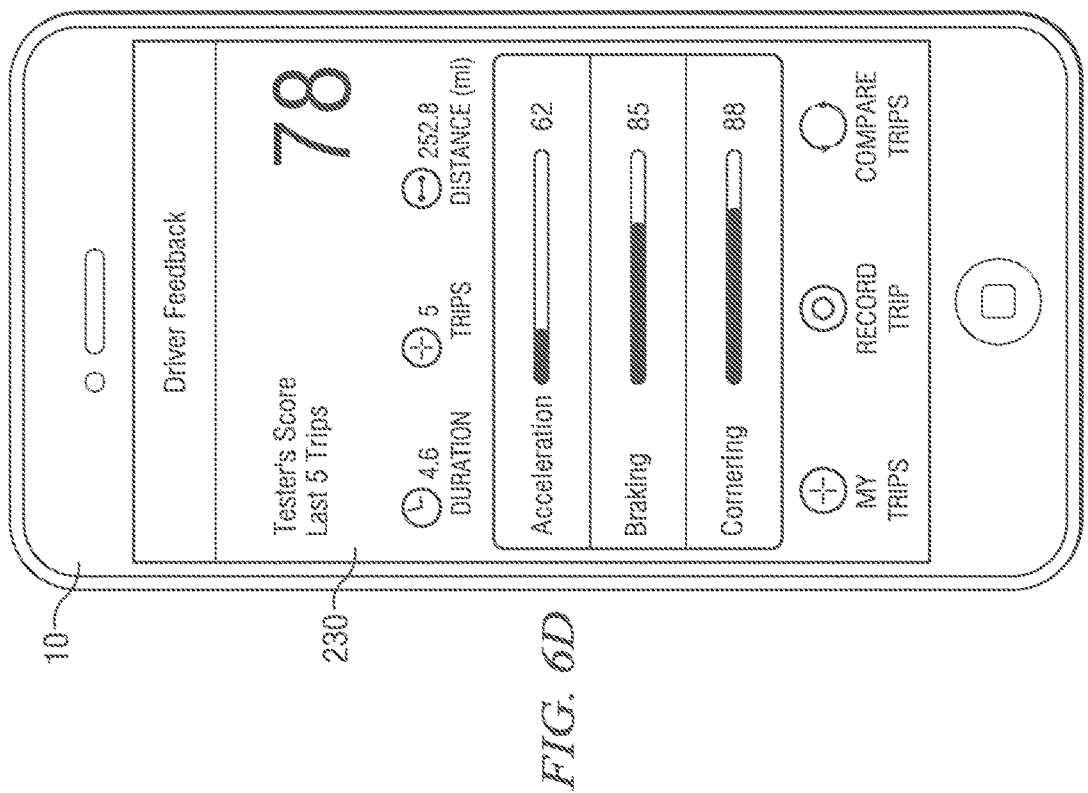

FIG. 6D illustrates an example screenshot of a summary screen 230 for a group of multiple data collection sessions, including three multi-session driving behavior metrics (Acceleration, Braking, and Cornering) and a multi-session driving score ("78") calculated by data processing module 42 for the group of data collection sessions. Each multi-session driving behavior metric, as well as the driving score, for the group of sessions may be calculated based on any number of data collection sessions, and using any suitable algorithm. For example, each multi-session metric/score may be an average (e.g., straight or weighted average) of the respective metrics/scores determined for the n most recent data collection sessions. Further, the multi-session metric/score may be filtered according to preset or user-selected criteria. For example, each multi-session metric/score may be an average (e.g., straight or weighted average) of the respective metrics/scores determined for the n most recent data collection sessions that meet one or more preset or user-selected criteria regarding the respective data collection session, e.g., the particular driver, time of day, trip distance, trip duration, geographic area of travel, weather conditions, traffic conditions, or any other relevant data accessible to data processing module 42. Thus, for instance, module 42 may calculate multi-session driving behavior metrics and driving scores for the five most recent trips by Bob, which were further than 3 miles, within the geographic limits of a particular city, and during good weather conditions.

The number of data collection sessions included in a particular multi-session driving metric/score may be automatically or manually selected in any suitable manner, e.g., a predetermined number of sessions, a number automatically determined by module 42 (e.g., all sessions occurring within a predetermined time period), a number manually selected by a user, or determined in any other manner.

In embodiments in which particular multi-session driving metrics/scores represent weighted averages, each individual-session metric (e.g., each individual-session Braking metric) to be averaged into a weighted average may be weighted based on recentness (e.g., based on the elapsed time since that session, or the sequential order position of that session (e.g., the $3^{rd}$ most recent session)), trip duration, trip distance, or any other relevant criteria accessible to data processing module 42. Thus, for instance, the weighting of each individual-session metric to be averaged into a weighted average may be weighted proportionally according to the number of days since each respective session, such that a trip that occurred 20 days ago is weighted twice as much as a trip that occurred 20 days ago. As another example, the $1^{st}$ most recent, $2^{nd}$ most recent, $3^{rd}$ most recent, and $4^{th}$ most recent sessions may be assigned predefined weighting factors of 0.50, 0.30, 0.15, 0.05, respectively. As another example, a 6-mile trip may be weighted the same as, or twice as much, as a 3-mile trip, depending on the specific embodiment. As another example, a 30-minute trip may be weighted the same as, or three times as much, a 10-minute trip, depending on the specific embodiment.

Alternatively, instead of displaying the average of the metrics/scores determined for a group of data collection sessions, summary screen 230 may display the median value for particular metrics/scores. Thus, for example, summary screen 230 may display for each metric the median value for that metric over the last seven trips. As another alternative, summary screen 230 may display the lowest or highest value for particular metrics/scores. Thus, for example, summary screen 230 may display for each metric the lowest value for that metric over the last seven trips.

It should be understood that multi-session driving metrics/scores may be determined using any combination of techniques or algorithms discussed above, or using any other suitable techniques or algorithms.

FIG. 6E illustrates an example screenshot of a screen 240 summarizing various data for each of multiple data collection sessions. In this example, screen 240 indicates for each data collection session for a particular driver: a trip description (manually entered by a user or automatically determined by module 42, e.g., based on GPS data), trip date, trip time (e.g., session start time, end time, or midpoint), and driving score (indicated by a bar graph and numerical value). In addition to or instead of displaying the driving score for each session, screen 240 may display one or more driving behavior metrics for each session, and/or other data relevant to each session (e.g., weather conditions, traffic conditions, trip distance, trip duration, etc.). Any number of sessions may be displayed, and the particular sessions that are displayed may be filtered, e.g., according to any of the criteria discussed above. In the illustrated example, the user may scroll down on screen 240 to view data for additional sessions.

Figure 6F:
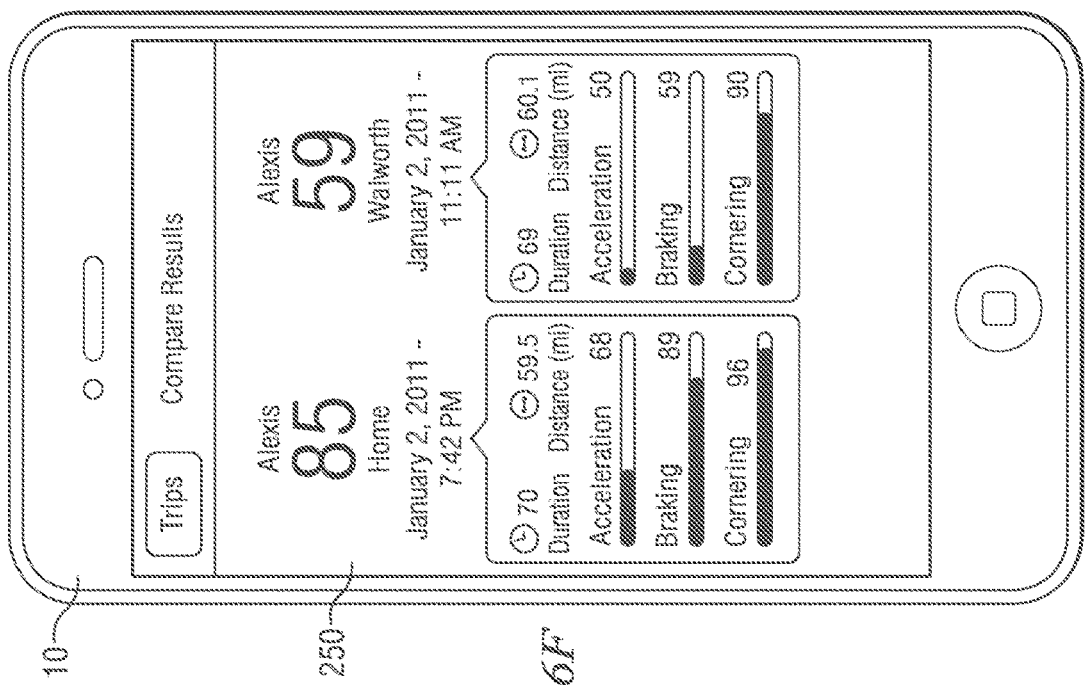

FIG. 6F illustrates an example screenshot of a screen 250 in which multiple trips can be compared. In this example, two trips by the same driver are compared. However, trips by different drivers may similarly be compared. The trips being compared may be selected by a user, or automatically selected by module 42 based on any suitable criteria. The compare function may be used to test drivers against a particular test course. For example, a driver education instructor could collect driving behavior metrics for himself by driving a test course. Later, students could collect driving behavior metrics while driving the same test course as previously driven by the instructor. The driving behavior metrics of the instructor could then be used as a standard against which to compare the driving behavior metrics of the students.

Figure 6G:
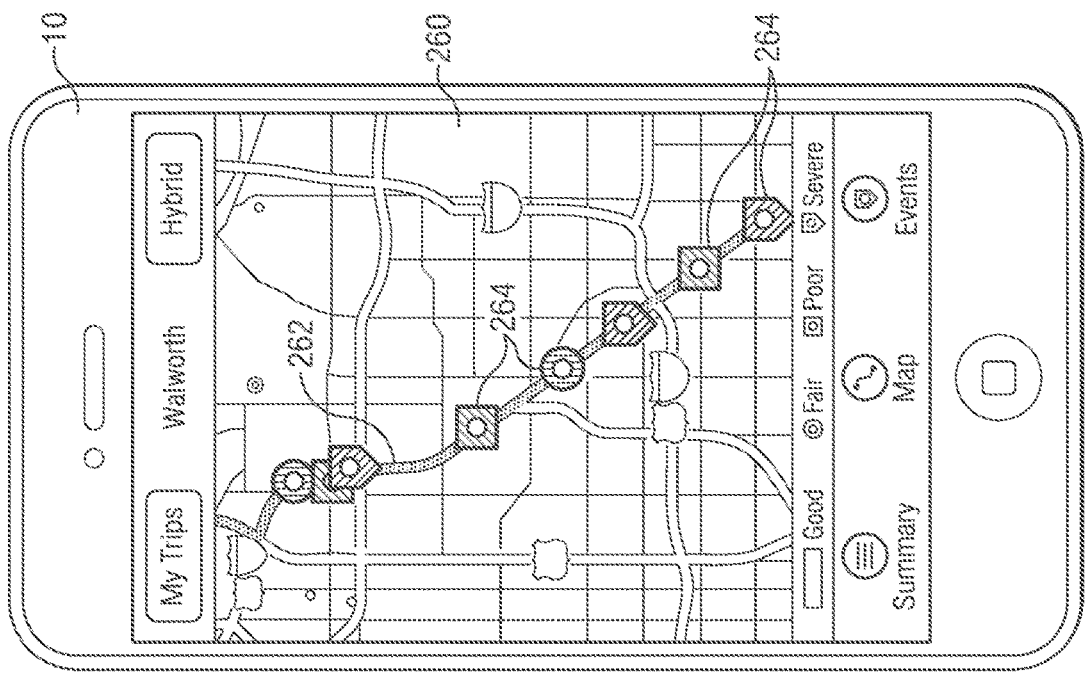

FIG. 6G illustrates an example screenshot of a map screen 260, indicating the path 262 of a recorded trip, which may be generated based on data collected by location tracking system 56 (e.g., GPS data). Screen 260 may also display icons 264 indicating the locations of notable driving events (NDEs). Such icons 264 may indicate the type and/or severity level of each NDE. In the illustrated example, the type of NDE (e.g., type "L", "R", "A", or "D") is indicated by the shape of the respective icon 264, and the severity level of the NDE is indicated by the color of the icon 264, indicated in FIG. 6G by different shading. In some embodiments, the user may select a particular icon 264 to display (e.g., via a pop-up window or new screen) additional details regarding the respective NDE.

It should be understood that driving analysis application 50 may generate any number of additional screens for displaying the various information collected or processed by application 50.

Figure 3:
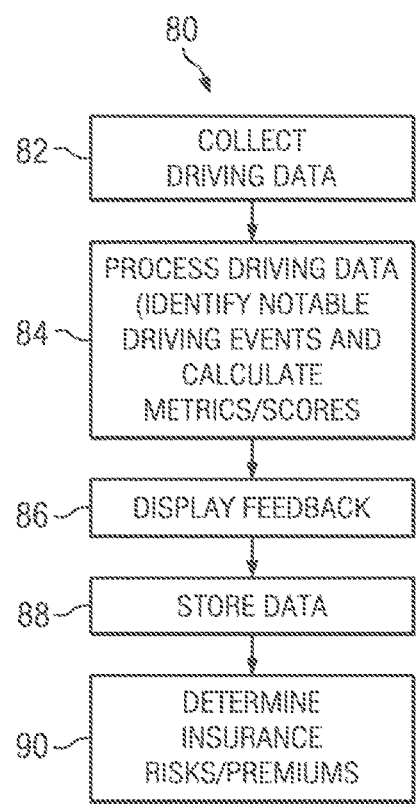
FIG. 3 illustrates an example method of collecting and processing driving data, according to certain embodiments.

FIG. 3 illustrates an example method 80 of providing driver feedback, according to certain embodiments. Any or all of the steps of method 80 may be performed by the various modules of driving analysis application 50.

At step 82, data collection module 40 may collect driving data during a data collection session (which may correspond to a driving trip, a portion of a driving trip, or multiple driving trips). The collected driving data may include, e.g., driving behavior data collected by accelerometer 54, location tracking system 56, etc. and/or driving environment data collected by environmental data applications 58. The collected driving data may also include driving behavior data and/or driving environment data collected by external devices and communicated to mobile device 10.

Data collection module 40 may control the start and stop of the data collection session either manually or automatically, as discussed above. In some embodiments, this may include interacting with the user (driver or other person) to manage the physical orientation of mobile device 10 in order to allow the driving data collection to begin (or re-start after an interruption), as discussed above.

At step 84, data processing module 42 may process or analyze any or all of the driving data collected at step 82, and calculate one or more driving behavior metrics and/or scores corresponding to the data collection session, e.g., as discussed above. In addition, data processing module 42 may identify "notable driving events" (NDEs) and determine the severity of such events, e.g., as discussed above. In some embodiments, data processing module 42 may process the collected data in real time or substantially in real time. In other embodiments, data processing module 42 may process the collected data after some delay period, upon the end of the data collection session, in response to a request by a user (e.g., a user of mobile device 10, a user at remote computer 150, or other user), upon collection of data for a preset number of data collection session, or at any other suitable time or in response to any other suitable event.

In some embodiments, data processing module 42 may calculate one or more individual driving behavior metrics (e.g., acceleration, braking, cornering, etc.) and/or driving scores for the current or most recent data collection session. Further, data processing module 42 may calculate one or more individual driving behavior metrics and/or driving scores for multiple data collection sessions. For example, data processing module 42 may calculate filtered or averaged driving behavior metrics and/or driving scores for a group of data collection sessions (e.g., as discussed above), including the current or most recent data collection session.

At step 86, feedback module 44 may display any of the data collected by data collection module 40 at step 82 (e.g., raw data or filtered raw data) and/or any of the metrics, scores, or other data calculated or proceed by data processing module 42 at step 84. This may include any manner of "displaying" data as discussed above, e.g., displaying data on display device 36, providing visual, audible, or other sensory feedback to the driver via mobile device 10 or other device in the vehicle, communicating data to remote computer devices for remote display, etc. In some embodiments, feedback module 44 may facilitate user interaction with application 50 (e.g., via a touch screen display 36 or other input devices 38) allowing the user to view any of the data discussed above, e.g., by user selection or navigation of displayed objects).

At step 88, feedback module 44 may initiate and/or manage the storage of any of the data collected by data collection module 40 at step 82 (e.g., raw data or filtered raw data) and/or any of the metrics, scores, or other data calculated or proceed by data processing module 42 at step 84, such that the stored data may be subsequently accessed, e.g., for display or further processing. For example, feedback module 44 may store data in local volatile memory for display, in local non-volatile memory as historical driving data 46, and/or in remote memory as historical driving data 152.

As shown in FIG. 3, method 80 may then return to step 82 for the collection of new driving data. It should be understood that the steps shown in FIG. 3 may be performed in any suitable order, and additional steps may be included in the process. Further, certain steps may be performed continuously (e.g., the data collection step 82 may continue throughout the data collection process). Further, multiple steps may be performed partially or fully simultaneously.

In some embodiments, steps 82-88 (or at least portions of such steps) may be executed in real time or substantially in real time such that steps 82-88 are continuously performed, or repeated, during a particular data collection session. In such embodiments, at step 86 data may be prepared for subsequent display rather than being displayed in real time, while the process continues to collect, process, and store new driving data. However, as discussed above, certain feedback may be provided at step 86 in real time, e.g., real time feedback indicating the occurrence of notable driving events. In other embodiments, one or more steps may not be performed in real time. For example, some or all of the processing, display, and storage steps may be performed after the completion of the data collection session, e.g., when more processing resources may be available. For instance, collected raw data may be stored in first memory (e.g., cache or other volatile memory) during the data collection session; and then after the end of the data collection session, the collected data may be processed, displayed, stored in second memory (e.g., stored in non-volatile memory as historical driving data 46), and/or communicated to remote entities for storage, processing, and/or display.

As discussed above, in some embodiments, driving data collected by application 50 may be used by various third parties for various purposes. Thus, for example, at step 90, an insurance provider may receive or access driving behavior metrics and/or driving scores collected by application 50 (e.g., by receiving or accessing historical driving data 46 directly from mobile device 10 and/or by receiving or accessing historical driving data 152 from external storage), and analyze such data for performing risk analysis of the respective driver. The insurance provider may determine appropriate insurance products or premiums for the driver according to such risk analysis.

Figure 4:
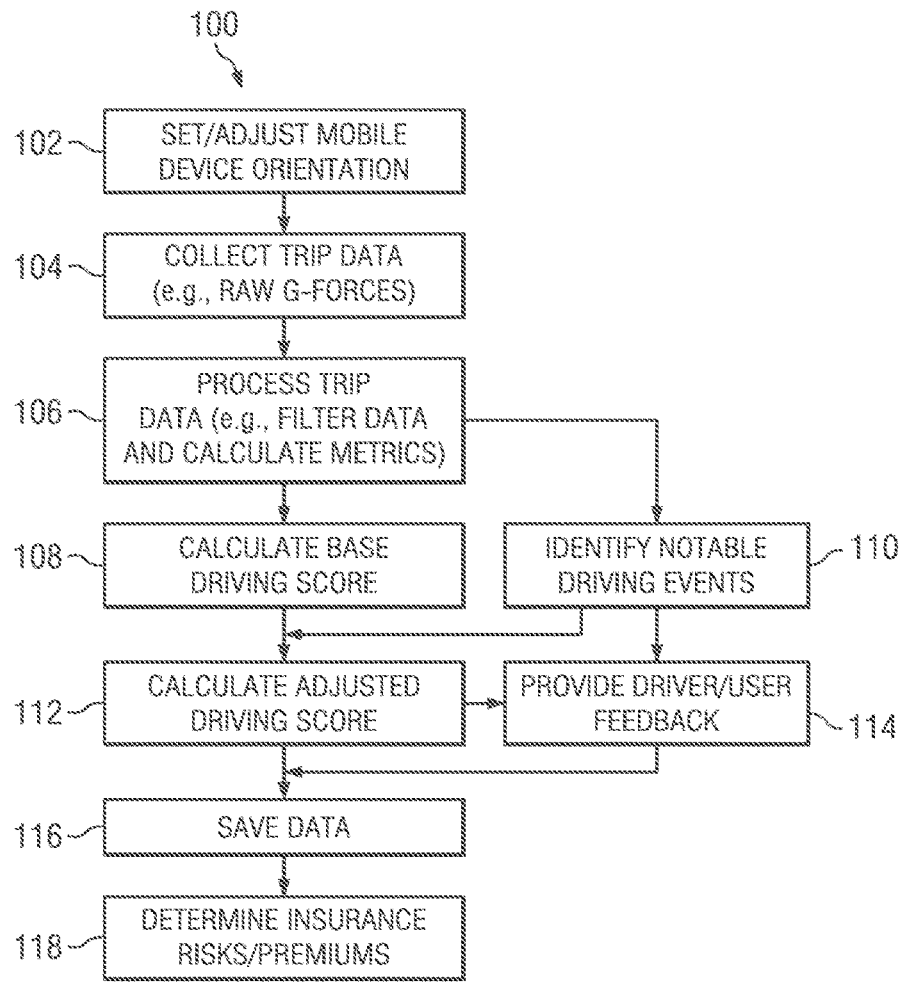
FIG. 4 illustrates an example method of collecting and processing driving data using example algorithms, according to certain embodiments.

FIG. 4 illustrates an example method 100 of providing driver feedback using example algorithms, according to certain embodiments. Any or all of the steps of method 100 may be performed by the various modules of driving analysis application 50.

At step 102, data collection module 40 may interact with the user to adjust the mobile device 10 such that the orientation of mobile device 10 is suitable for collecting driving data. For example, data collection module 40 may instruct the user to position the mobile device 10 towards the front of the vehicle and with the top end of the mobile device 10 facing the front of the vehicle.

Once data collection module 40 determines that mobile device 10 is properly oriented, data collection module 40 may begin collecting driving data, i.e., start a data collection session, at step 104. For example, data collection module 40 may begin collecting raw G-force data (i.e., acceleration data) from built-in accelerometer 54. The collected G-force data may provide data for multiple different acceleration directions, e.g., lateral G-force data regarding lateral acceleration and longitudinal G-force data regarding longitudinal acceleration. Module 40 may time stamp the collected data. Further, module 40 may filter or truncate the beginning and end of the data collection session, the extent of which filtering or truncation may depend on the length of the data collection session. For example, if the data collection session exceeds 4 minutes, module 40 may erase data collected during the first and last 60 seconds of the data collection session; whereas if the data collection session does not exceed 4 minutes, module 40 may erase data collected during the first and last 3 seconds of the data collection session. The particular values of 4 minutes, 60 seconds, and 3 seconds are example values only; any other suitable values may be used.

At step 106, data processing module 42 may process the collected driving data. For example, module 42 may calculate a one-second moving average of the G-force. Thus, if the data collection is for instance 5 Hz, the 5-step moving average may be calculated.

Module 42 may then calculate the "jerk" at each time stamp $T_i$, wherein jerk at a particular time stamp $T_j$ is defined as follows:

Jerk=abs (moving averaged G-force at time stamp $T_j$−moving averaged G-force at time stamp $T_{j-1}$)/unit_time (1 second)

(Alternatively, jerk may be calculated using raw G-forces data instead of averaged G-force data.)

Module 42 may then calculate the one-second moving average of the jerk.

Module 42 may then determine one or more driving behavior metrics based on the moving averaged jerk and G-force data. For example, module 42 may determine a G-force percentile and a jerk percentile at each time stamp $T_i$ by accessing look-up tables corresponding to one or more relevant parameters. For instance, a portion of an example look-up table for an example set of relevant parameters is provided below:

Relevant Parameters:
   Vehicle: Impala
   Vehicle type: Sedan
   Acceleration direction (lateral or longitudinal): Lateral
   Type of data (G-force or Jerk): G-force
   Speed range: 0-100 mph

TABLE 1

| G-force Percentile Look-Up Table | |
|---|---|
| G-force range | Percentile |
| 0.000   0.012 | 0 |
| 0.013   0.025 | 1 |
| 0.026   0.038 | 2 |
| 0.039   0.051 | 3 |
| 0.052   0.064 | 4 |
| 0.065   0.077 | 5 |
| 0.078   0.090 | 6 |

Module 42 may store or have access to any number of such look-up tables for various combinations of relevant parameters. For example, module 42 may store a look-up table (similar to Table 1) for determining the jerk percentile. As another example, module 42 may store similar look-up tables for determining G-force and jerk percentiles for different combinations of vehicles, vehicle types, speed ranges, acceleration direction (lateral or longitudinal), etc.

At step 108, data processing module 42 may calculate a Base Driving Score for the data collection session, according to the following equation:

Base Driving Score=(AVG_G-force_percentile)*$W1$+ (AVG_Jerk_percentile)*$W2$ wherein:
   AVG_G-force_percentile is the average of the G-force percentiles for all time stamps $T_i$ during the data collection session;
   AVG_Jerk_percentile is the average of the jerk percentiles for all time stamps $T_i$ during the data collection session; and
   $W1$ and $W2$ are weighting constants used to weight the relative significance of G-force data and jerk data as desired.

As another example, the base driving score may be calculated according to the following equations:

$T_i$ Driving Score=min(100,250−(2*$T_i$ percentile))

Base Driving Score=average of all $T_i$ Driving Scores in which max G-force (lateral,longitudinal)<predefined minimal value.

wherein:
   $T_i$ percentile is a percentile determined for each time stamp $T_i$ (e.g., G-force percentile, jerk percentile, or a weighted average of G-force percentile and jerk percentile for the time stamp $T_i$);
   $T_i$ Driving Score is a driving score for each time stamp $T_i$; and
   $T_i$ Driving Scores in which max G-force (lateral, longitudinal)<predefined minimal value indicates that data from time stamps in which the max (lateral, longitudinal) G-force is less than some predefined minimal value (e.g., 0.01) is excluded from the calculations. For example, due to the fact that g-forces may be less than some predefined minimal value (e.g., 0.01) at some or many time stamps (e.g., during highway cruise driving), as well as the issue of unstable g-force reading (below) a predefined minimal value, module 42 may ignore data from time stamps in which the max (lateral, longitudinal) G-force is less than the predefined minimal value.

At step 110, data processing module 42 may identify and analyze any notable driving events during the data collection session, based on the collected/processed G-force data and jerk data. For example, module 42 may compare the lateral and longitudinal G-force data to corresponding threshold values to identify the occurrence of notable driving events. For example, module 42 may execute the following example algorithms to identify the occurrence and type of a notable driving event (NDE) for a Chevrolet Impala:
   lat_magnitude_gf=max(0, abs(LatG)−0.40);
   lon_magnitude_gf=max(0, abs(LonG)−0.30);
   magnitude_gf=max(lat_magnitude_gf, lon_magnitude_gf);
   if magnitude_gf=lat_magnitude_gf and latG.>0 then NDE_type="L";
   else if magnitude_gf=lat_magnitude_gf and latG.<=0 then NDE_type="R";
   else if magnitude_gf=lon_magnitude_gf and lonG<0 then NDE_type="A";
   else if magnitude_gf=lon_magnitude_gf and lonG>=0 then NDE_type="D";
   else no NDE identified.
wherein:
LatG=lateral G-forces detected by the accelerometer;
LonG=longitudinal G-forces detected by the accelerometer;
NDE_type "L"=Left Cornering
NDE_type "R"=Right Cornering
NDE_type "A"=Acceleration
NDE_type "D"=Deceleration The threshold values used in such algorithms (e.g., the LatG and LonG threshold values 0.40 and 0.30 shown above) may be specific to one or more parameters, such that module 42 applies appropriate thresholds based on the parameter(s) relevant to the data being analyzed. For example, module 42 may store different threshold values for different types of vehicles. To illustrate an example, module 42 may store the following threshold values for three different vehicles: Impala, Camaro, and FordVan:
   Impala (shown above)
      LatG threshold=0.40
      LonG threshold=0.30

Camaro
LatG threshold=0.60
LonG threshold=0.40
Ford Van
LatG threshold=0.30
LonG threshold=0.30

It should be understood that the threshold values shown above are examples only, and that any other suitable values may be used.

Figure 7:
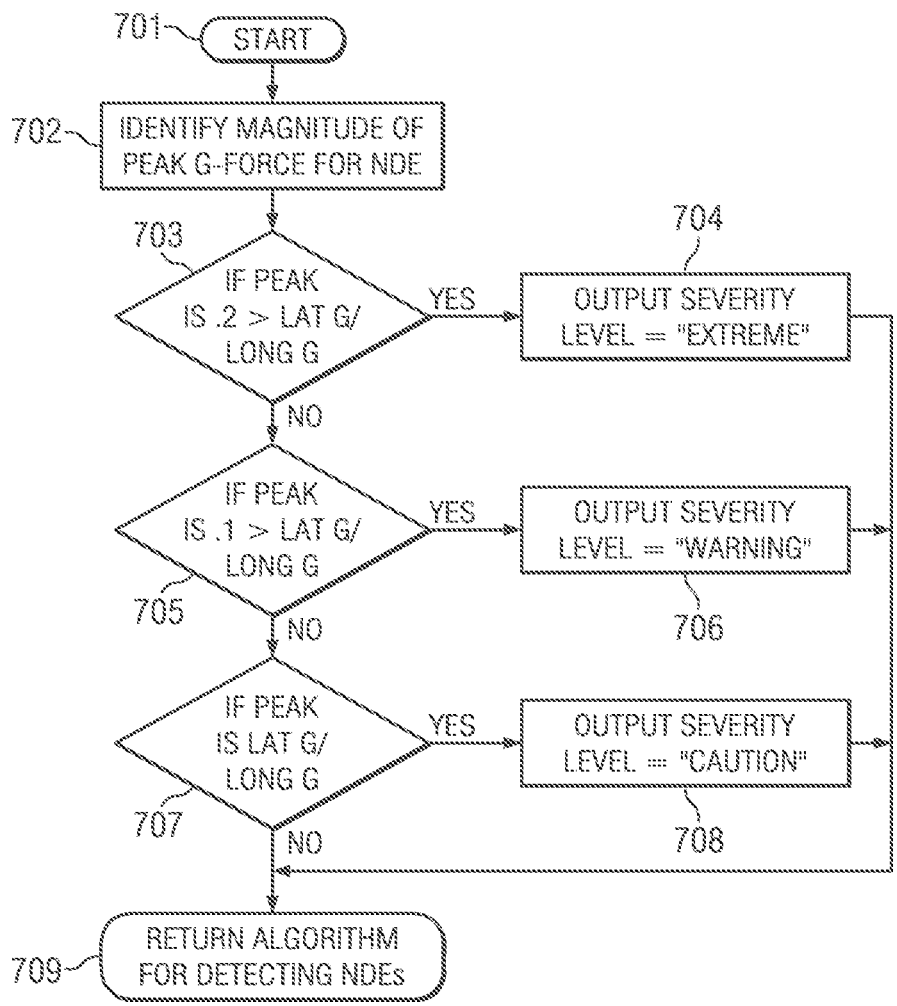
FIG. 7 is a flow chart of an illustrative algorithm for determining severity levels of notable driving events (NDE) identified during data collection sessions.

Data processing module 42 may further determine the severity level of each notable driving event (NDE) identified during the data collection session. For example, FIG. 7 provides an illustrative flow chart wherein module 42 may execute the following algorithm to determine the severity level (e.g., caution, warning, or extreme) of each NDE:

start 701 the algorithm
identify 702 the G-force magnitude peak associated with the NDE;
if the G-force magnitude peak is at least 0.2 above the relevant LatG/LonG threshold 703, the NDE severity level is "extreme" 704;
else if the G-force magnitude peak is at least 0.1 above the relevant LatG/LonG threshold 705, the NDE severity level is "warning" 706;
else if the G-force magnitude peak is above the caution threshold 707, the NDE severity level is "caution" 708; and
return 709 to the algorithm for detecting NDEs.

It should be understood that the threshold values shown above (0.2 and 0.1) are examples only, and that any other suitable values may be used.

Figure 8:
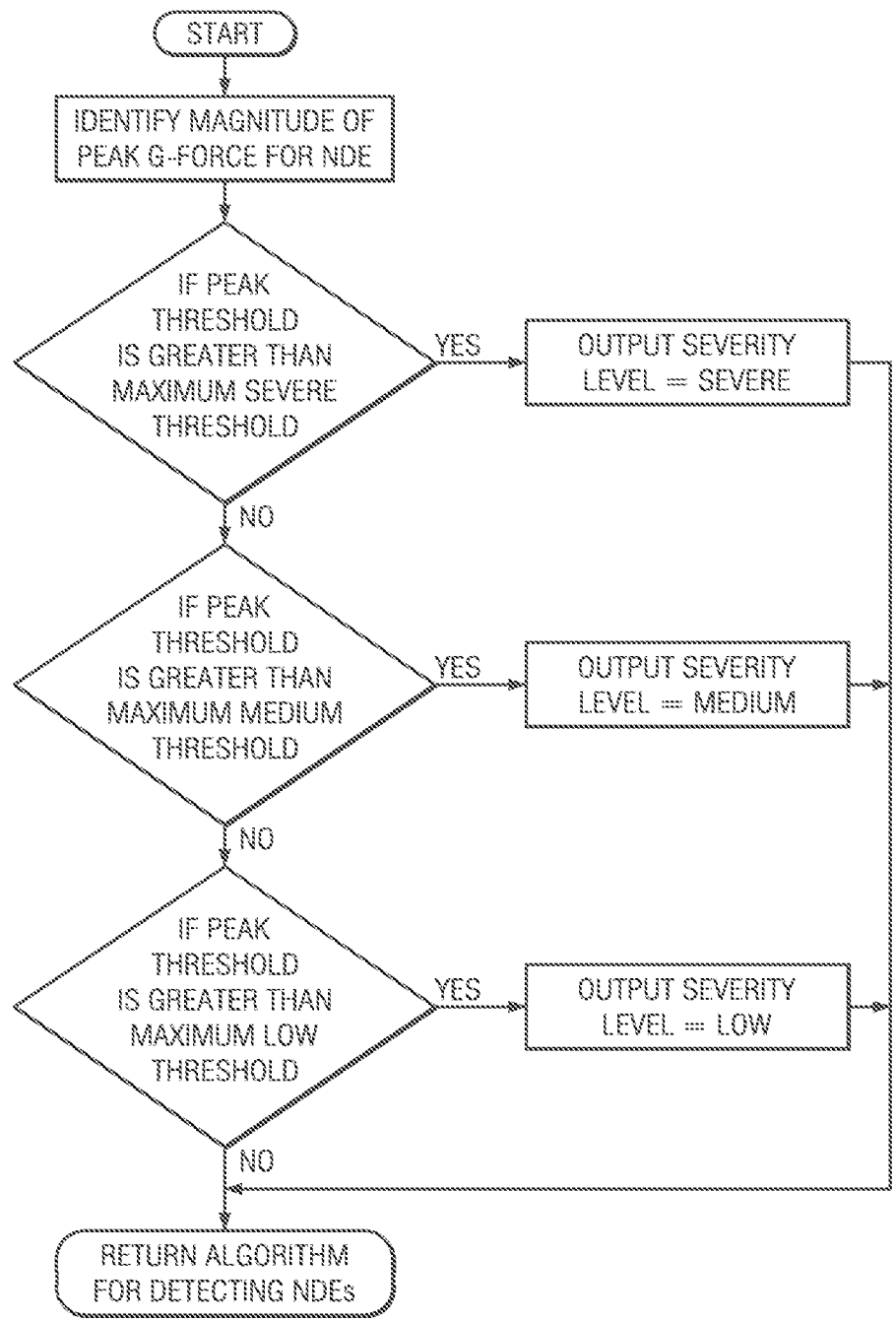
FIG. 8 is a flow chart of an illustrative algorithm for determining severity levels of notable driving events (NDE) identified during data collection sessions.

FIG. 8 is a flow chart of an alternative illustrative algorithm for determining severity levels of notable driving events (NDE) identified during data collection sessions. In this embodiment, the output severity levels are "severe," "medium" and "low."

Data processing module 42 may further "de-dupe" identified NDEs, i.e., eliminate or attempt to eliminate double counting (or more) of the same NDE. For example, module 42 may apply an algorithm that applies a 30 second rule for de-duping the same type of NDE (e.g., L, R, A, or D), and a 4 second rule for de-duping different types of NDEs. Thus, if multiple NDEs of the same type (e.g., two L-type events) are identified within a 30 second window, module 42 assumes that the same NDE is being counted multiple times, and thus treats the multiple identified NDEs as a single NDE. Further, if multiple NDEs of different types (e.g., one L-type event and one R-type event) are identified within a 4 second window, module 42 assumes that the same NDE is being counted multiple times, and thus treats the multiple identified NDEs as a single NDE, and applies any suitable rule to determine the NDE type that the NDE will be treated as (e.g., the type of the first identified NDE controls, or a set of rules defining that particular NDE types control over other NDE types).

It should be understood that the de-duping time limits shown above (30 seconds and 4 seconds) are examples only, and that any other suitable time limits may be used.

Referring again to FIG. 4, at step 116 feedback module 44 may initiate and/or manage the storage of any of the data collected by data collection module 40 at step 104 (e.g., raw data or filtered raw data) and/or any of the metrics, scores, or other data calculated or processed by data processing module 42 at steps 106-112, such that the stored data may be subsequently accessed, e.g., for display or further processing. For example, feedback module 44 may store data in local volatile memory for display, in local non-volatile memory as historical driving data 46, and/or communicate data to remote devices 150 and/or remote driving data storage 152.

As discussed above, in some embodiments, driving data collected by application 50 may be used by various third parties for various purposes. Thus, for example, at step 118, an insurance provider may receive or access driving behavior metrics and/or driving scores collected by application 50 (e.g., by receiving or accessing historical driving data 46 directly from mobile device 10 and/or by receiving or accessing historical driving data 152 from external storage), and analyze such data for performing risk analysis of the respective driver. The insurance provider may determine appropriate insurance products or premiums for the driver according to such risk analysis.

At step 112 (see FIG. 4), data processing module 42 may calculate an Adjusted Driving Score for the data collection session, by adjusting the Base Driving Score certain values calculated at step 108 based on NDEs determined at step 110. For example, module 42 may deduct from the Base Driving Score based on the number, type, and/or severity level of NDEs determined at step 110. In some embodiments, only certain types and/or severity levels of NDEs are deducted from the Base Driving Score. For example, module 42 may execute the following algorithm, in which only "warning" and "extreme" level NDEs (but not "caution" level NDEs) are deducted from the Base Driving Score:

NDE Penalty for each NDE=50*(G-force−G-force_warning_threshold);
Adjusted Driving Score=Base Driving Score−sum (NDE_Penalties)

It should be understood that this algorithm is an example only, and that any other suitable algorithms for determining an Adjusted Driving Score may be used.

At step 114, feedback module 44 may display any of the data collected by data collection module 40 at step 104 (e.g., raw data or filtered raw data) and/or any of the metrics, scores, or other data calculated or processed by data processing module 42 at steps 106-112. This may include any manner of "displaying" data as discussed above, e.g., displaying data on display device 36 on mobile device 10, providing visual, audible, or other sensory feedback to the driver via mobile device 10 or other device in the vehicle, communicating data to remote computer devices for remote display, etc. In some embodiments, feedback module 44 may facilitate user interaction with application 50 (e.g., via a touch screen display 36 or other input devices 38) allowing the user to view any of the data discussed above, e.g., by user selection or navigation of displayed objects).

Figure 5:
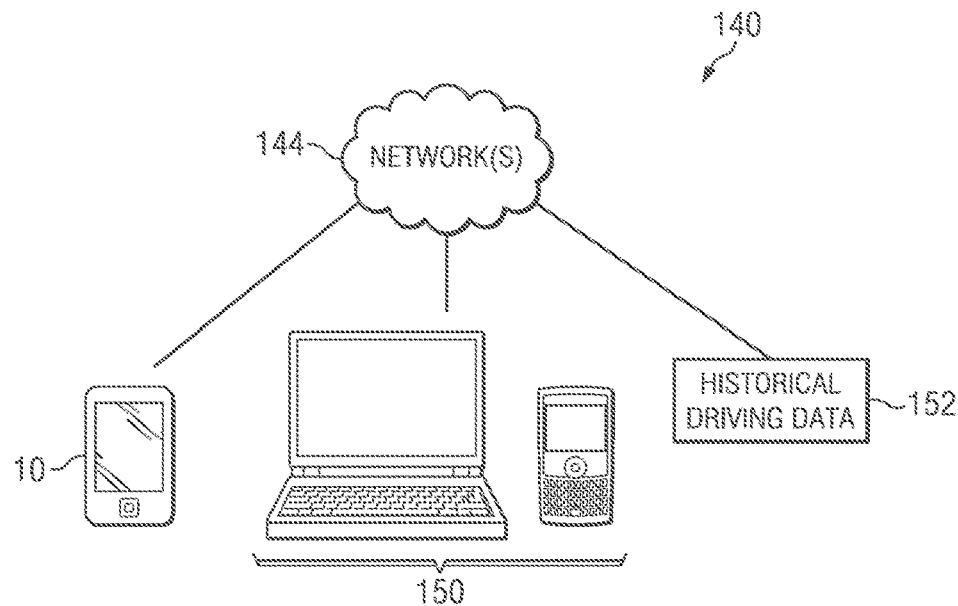
FIG. 5 illustrates an example system for sharing driving data between a mobile device including a driving analysis system and other external devices, according to certain embodiments.

FIG. 5 illustrates an example system 140 for sharing driving data between a mobile device 10 including driving analysis application 50 and other external systems or devices, according to certain embodiments. As shown, mobile device 10 may be communicatively connected to one or more remote computers 150 and/or remote data storage systems 152 via one or more networks 144.

Computers 150 may include any one or more devices operable to receive driving data from mobile device 10 and further process and/or display such data, e.g., mobile telephones, personal digital assistants (PDA), laptop computers, desktop computers, servers, or any other device. In some embodiments, a computer 150 may include any suitable application(s) for interfacing with application 50 on mobile device 10, e.g., which application(s) may be downloaded via the Internet or otherwise installed on computer 150.

In some embodiments, one or more computers 150 may be configured to perform some or all of the data processing discussed above with respect to data processing module 42 on mobile device 10. Such a computer may be referred to herein as a remote processing computer. For example, mobile device 10 may communicate some or all data collected by data collection module 40 (raw data, filtered data, or otherwise partially processed data) to a remote processing computer 150, which may process (or further process) the received data, e.g., by performing any or all of the driver data processing discussed above with respect to data processing module 42, and/or additional data processing. After processing the data, computer 150 may then communicate the processed data back to mobile device 10 (e.g., for storage and/or display), to other remote computers 150 (e.g., for storage and/or display), and/or to remote data storage 152. The data processing and communication of data by computer 150 may be performed in real time or at any other suitable time. In some embodiments, computer 150 may process driving data from mobile device 10 and communicate the processed data back to mobile device 10 such that the data may be displayed by mobile device 10 substantially in real time, or alternatively at or shortly after (e.g., within seconds of) the completion of a driving data collection session.

Using one or more computers 150 to perform some or all of the processing of the driving data may allow for more processing resources to be applied to the data processing (e.g., thus providing for faster or additional levels of data processing), as compared to processing the data by mobile device 10 itself. Further, using computer(s) 150 to perform some or all of the data processing may free up processing resources of mobile device 10, which may be advantageous.

Remote data storage devices 152 may include any one or more data storage devices for storing driving data received from mobile device 10 and/or computers 150. Remote data storage 152 may comprise any one or more devices suitable for storing electronic data, e.g., RAM, DRAM, ROM, flash memory, and/or any other type of volatile or non-volatile memory or storage device. A remote data storage device 152 may include any suitable application(s) for interfacing with application 50 on mobile device 10 and/or with relevant applications on computers 150.

Network(s) 144 may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or any other appropriate architecture or system that facilitates the communication of signals, data and/or messages (generally referred to as data) via any one or more wired and/or wireless communication links. The network(s) 144 may include any communication link known to persons of skill, including for example, cloud, cellular or satellite transmission, magnetic or optical media, radio frequency transmission, microwave or fiber optic transmission, or communications via Internet, cable, or satellite providers.

Figure 9:
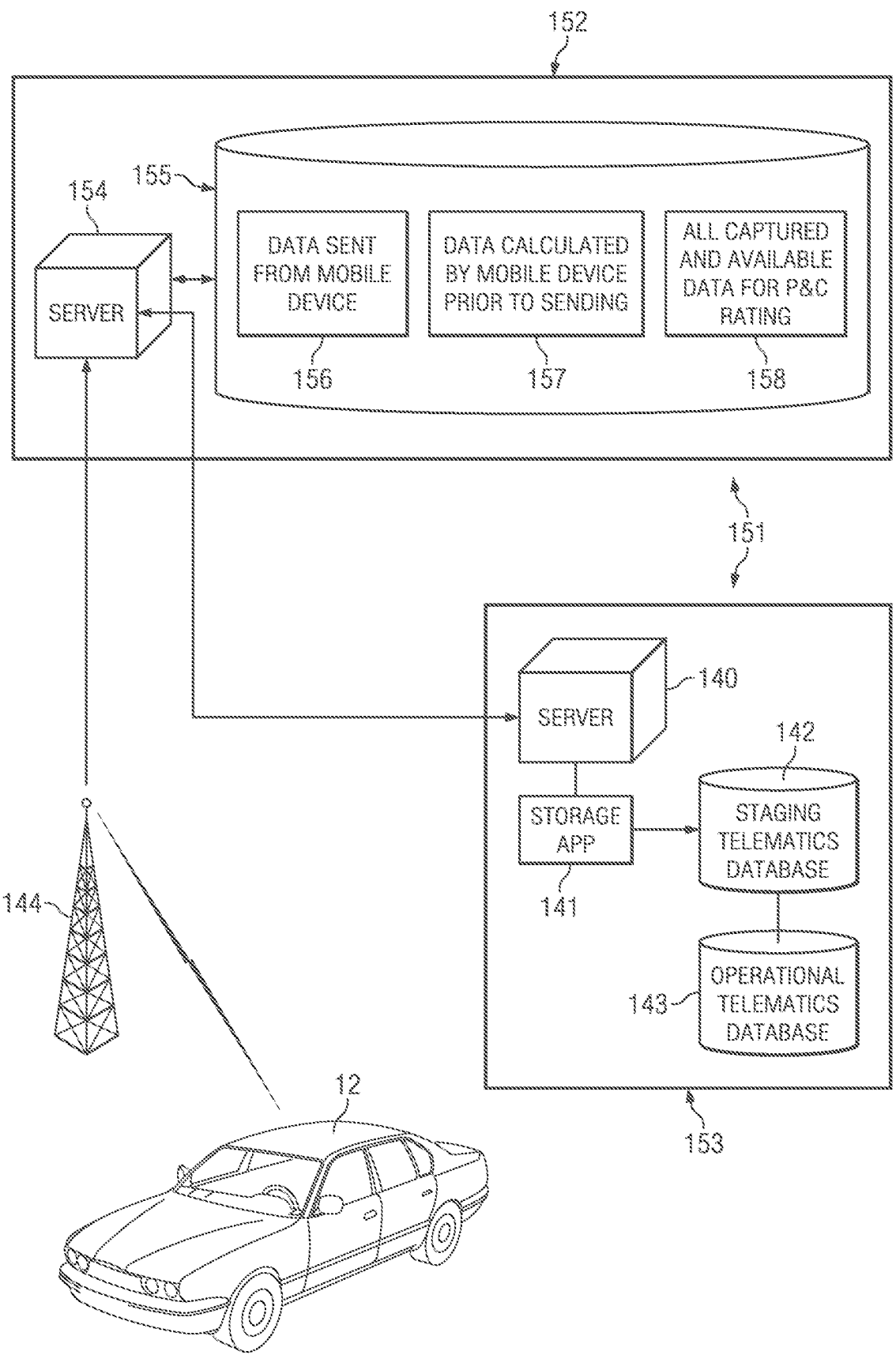
FIG. 9 is schematic illustration of an infrastructure for collecting vehicle operation data, transmitting vehicle operation data, receiving vehicle operation data and calculating insurance premiums based on vehicle operation data, wherein the infrastructure comprises a remote data storage system and a property and casualty system.

Referring to FIG. 9, an example of an architectural design for an infrastructure according to embodiments of the invention. An infrastructure 151 according to one embodiment comprises a remote data storage system 152 and a property and casualty system 153. Data may be transmitted via a network 144 from a mobile device 10 in a vehicle 12 to a remote data storage system 152.

The remote data storage system 152 comprises a server 154 and a database 155. The database 155 stores various data and information transmitted to it via the server 154, including: data received from a mobile device 156, data calculated by a mobile device prior to receiving 157, and captured and available data for property and casualty rating 158. Data received from a mobile device 156 may comprise: device identification; Bluetooth MAC address; trip number; location—latitude; location—longitude; location—coarse/fine indicator; speed; acceleration -X; acceleration -Y; acceleration -Z; GPS date and time; turn indicator and/or GPS accuracy. Prior to sending, the mobile device 10 may also calculate information. Data calculated by a mobile device prior to receiving 157 may include: turn indicator; lateral G force; longitudinal G force; turn radius; average lateral G force; average longitudinal G force; average turn radius; X midpoint; X now; X back 1; X back 2; Y midpoint; Y now; Y back 1; Y back 2; tangent calculation for radius 1; tangent calculation for radius 2; time change between locations; longitude G with local gravity; lateral G with local gravity; lateral G calculated; lateral G second derivative; and/or parallel G slope. Examples of captured and available data for property and casualty rating 158 may include: vehicle information (age, manufacturer, model, value), driver information (age, sex, marital status, driving record, accident history, residence), and insurance information (liability, uninsured motorists, comprehensive, collision, liability limits, deductibles, rebates, discounts).

The property and casualty system 153 comprises a server 140, a storage application 141, a staging telematics database 142 and an operational telematics data base 143. The property and casualty system 153 uses the data captured by the remote data storage system 152 to calculate property and casualty premiums for the operators of vehicles. Threshold metrics may be established for driving behaviors so that property and casualty premiums may be identified to correspond to the driving behaviors. This system may be automated so that the property and casualty premiums may be charge to the operators of vehicles in real time depending on their driving behaviors.

Figure 10:
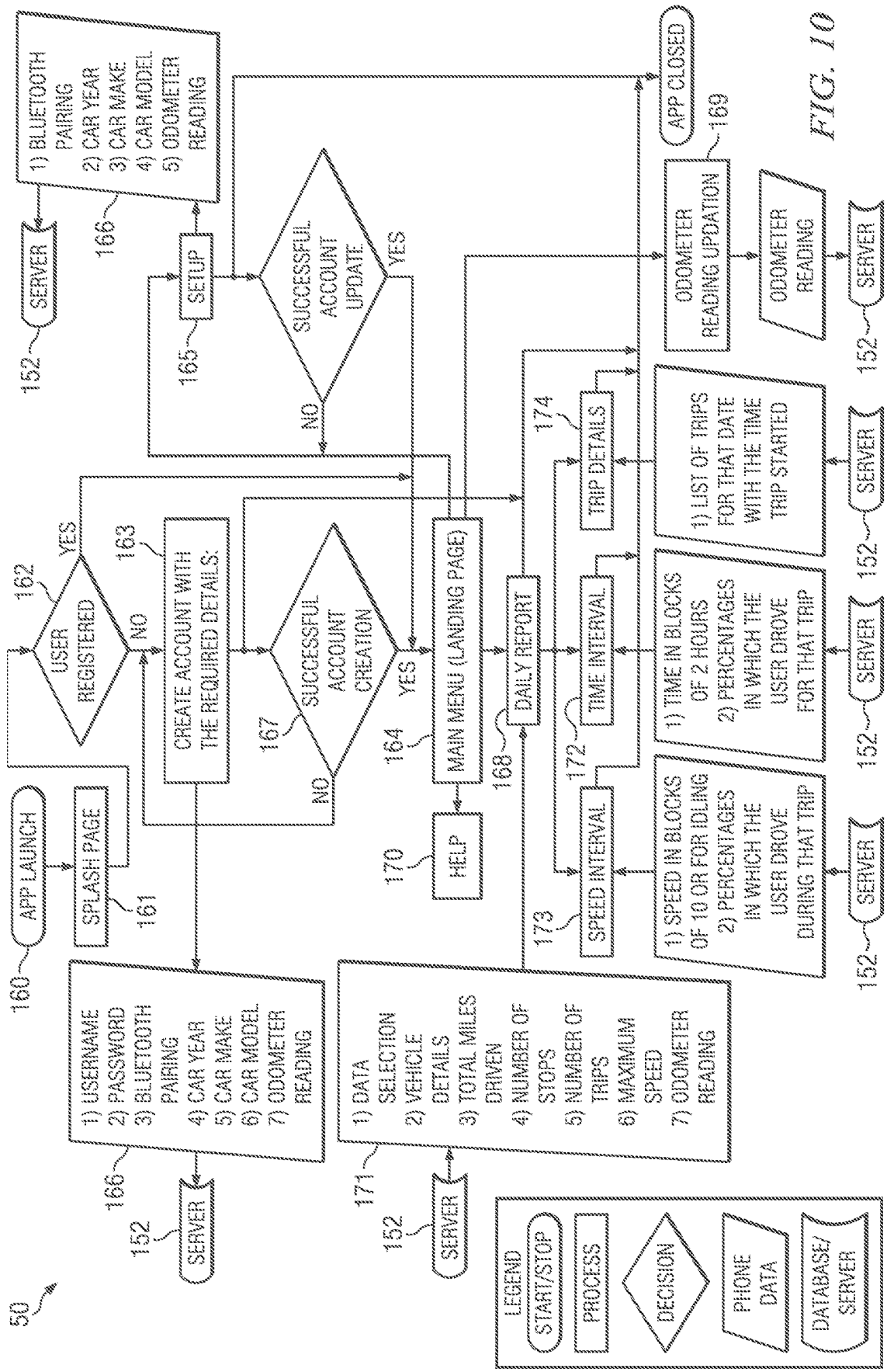
FIG. 10 is a flowchart of a driving analysis application that may be downloaded onto a mobile device.

FIG. 10 provides a flow chart for a driving analysis application 50. The application launches 160 on a mobile device 10 (see FIG. 1) and splashes 161 an introductory page publishing the name of the application and appropriate logos to identify the application. The application queries the user 162 to determine whether the user is registered. If the user is not registered, the application 50 will prompt the user to create an account 163. When the user is registering for the first time, the user may enter details like: username; password; vehicle make; vehicle year; vehicle model; and/or vehicle odometer reading. The application 50 may then determine if an account is successfully created 167, and if not again prompt the user to create an account 163. If an account is successfully created 167, the user may be directed to a main menu (landing page) 164 that may have options: (1) a Bluetooth pairing setup 165 for completing the registration or modifying the car which is being used; (2) a daily summary 168 giving details regarding the trips of the user; (3) an odometer option 169 for updating the odometer reading of the paired vehicle; and (4) a help section 170 for the user to report technical difficulties with the application 50 or to answer questions that the user may have.

From the main menu (landing page) 164, the user may select a Bluetooth pairing setup 165 for completing the registration or modifying the vehicle which is being operated by completing a Bluetooth pairing. If the user exits the application prior to Bluetooth pairing, then the user may not be able to access the daily summary and odometer details. If the Bluetooth pairing 165 is successful, then the data 166 (Bluetooth pairing; vehicle year; vehicle model; and/or vehicle odometer reading) may be transmitted to a server 154. If the Bluetooth pairing 165 is unsuccessful, the application 50 may return to the main menu (landing page) 164. Once as user has successfully created an account 163 and Bluetooth paired 165 the mobile device 10 with the vehicle 12, the application 50 always runs in the background for collection of data. As soon as the user starts the vehicle, the data logging starts to take place. Collected data is automatically transmitted to the server 154, described more fully below. During the whole process certain data is sent to the server 154 from the mobile device 10, and similarly after calculations are made, data may be received by the mobile device 10 from the server 154. Data sent to the server 154 may include: Username; Password; Vehicle Make; Vehicle Year; Vehicle Model; Odometer Reading; and Bluetooth Mac address. Data received from the server 154 may include: Date Selection; Vehicle Details; Total Miles Driven; Number of Stops; Number of Trips; Maximum Speed; Odometer Reading; Time Specific Details; Speed Specific Details; and Trip List.

In alternative embodiments of the invention, any trigger may be used to tell the application 50 to begin logging data. For example, a threshold engine speed (RPM) may trigger data logging. As a further example, movement of the vehicle 12 may trigger data logging.

FIG. 10 further shows that, from the main menu (landing page) 164, the user may select a daily summary 168 giving details regarding the trips of the user. Based on the trips for that particular day a daily report is available to the user. The daily report includes vehicle use data 171, which may be transmitted from the remote data storage device 152 to the mobile device 10. The vehicle use data 171 may include: 1) "date selection" for the user to select the date of which he wants the details; 2) "vehicle details" that were entered by the user at the start; 3) "total miles driven" are recorded by the application 50 once the user has registered; 4) "number of stops" provides information about the vehicle not moving, i.e., idling or being at 0 mph; 5) "number of trips" provides the total trips on that particular day; 6) "maximum speed" is the max speed reached on that particular day; and 7) "odometer reading" is the total odometer reading (User Entered Value+Total Miles Driven). The daily report may also allow the user to view: time specific details 172; speed specific details 173; and trip specific details 174.

Time specific details (Time Interval) 172 may include time in blocks of 2 hours displayed on the left hand side, which is helpful for the user to know in which times he has driven the most. Time specific details may be relevant to insurance providers to know whether the user is driving in high, moderate or low traffic times. Time specific details (Time Interval) 172 may also include trip percentages, so the user can see what percent of total daily driving each trip comprised.

Speed Specific Details (Speed Interval) 173 may include time in blocks of 10, with a separate section for idling displayed on the left hand side, which may be helpful for the user to know the speed range he has driven the most. It may be relevant to insurance providers to know whether the user is driving at high, moderate or low speeds to determine risks of potential accidents. Speed Specific Details (Speed Interval) 173 may also include percentages in which the user drove at particular speed ranges, wherein the percentages add up to a total of 100% for that day.

Different Trip Details 174 may contain a list of trips by the user on that particular day. When the user selects a particular trip, the application 50 may provide the user the route that was traversed on the trip, which is similar to a GPS plot on a map.

Figure 11B:
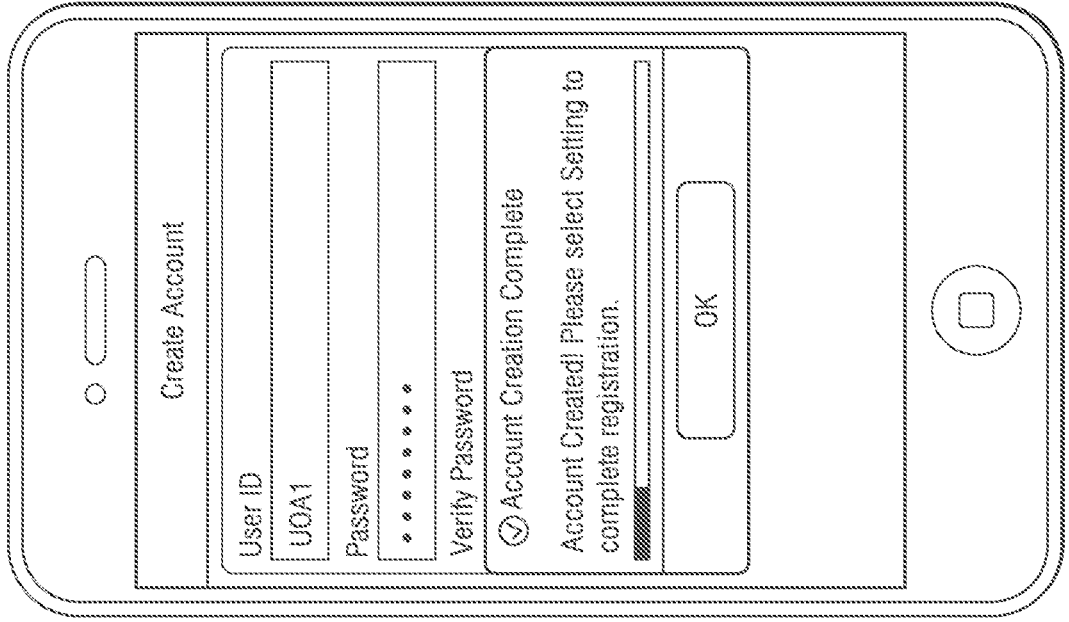
FIG. 11B is a screen shot of a graphic user interface of an Account Creation Complete screen of a driving analysis application.
Figure 11A:
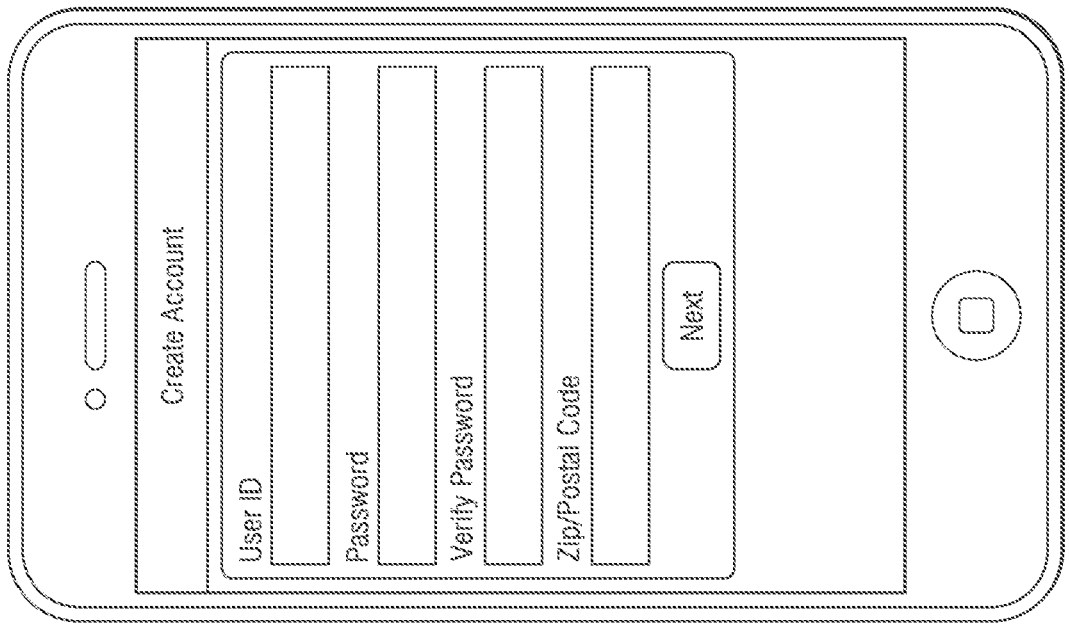
FIG. 11A is a screen shot of a graphic user interface of a Create Account screen of a driving analysis application.
Figure 11D:
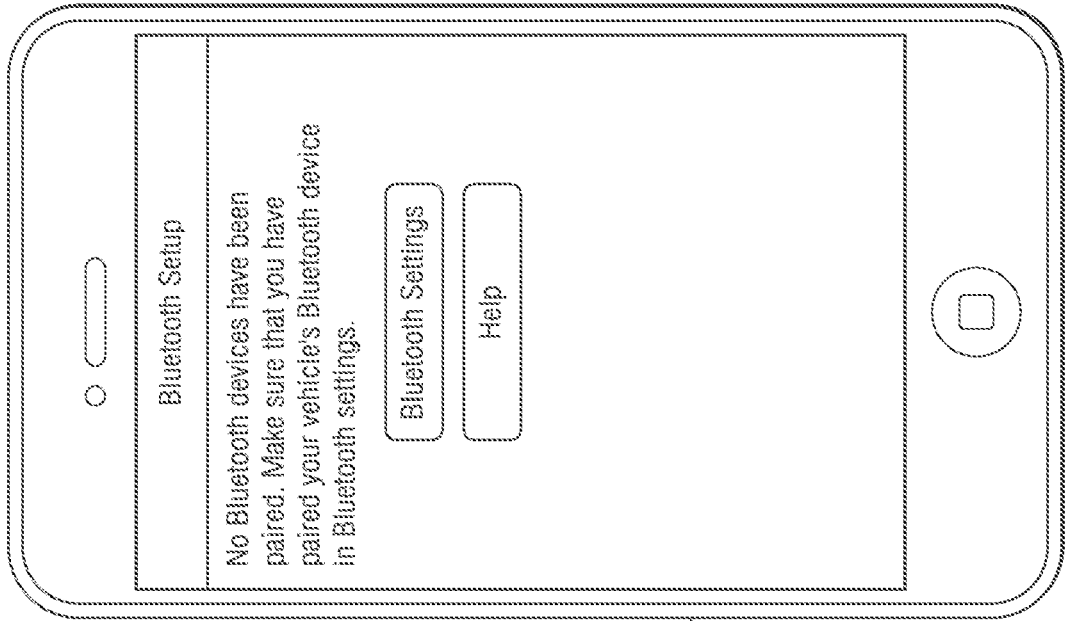
FIG. 11D is a screen shot of a graphic user interface of a Bluetooth Setup screen of a driving analysis application.
Figure 11C:
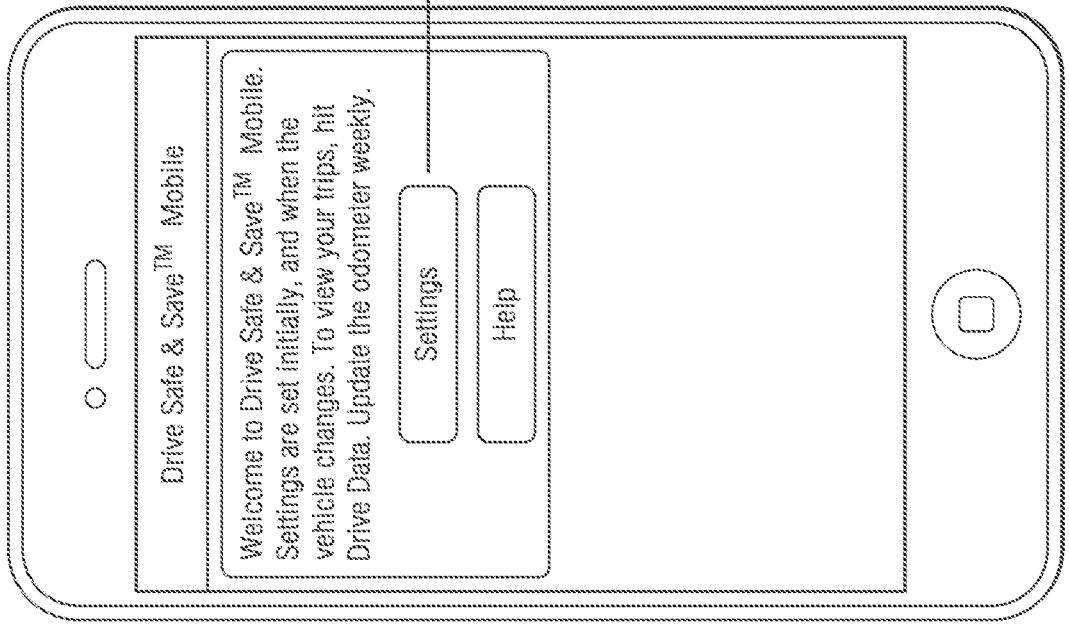
FIG. 11C is a screen shot of a graphic user interface of a Settings screen of a driving analysis application.
Figure 11F:
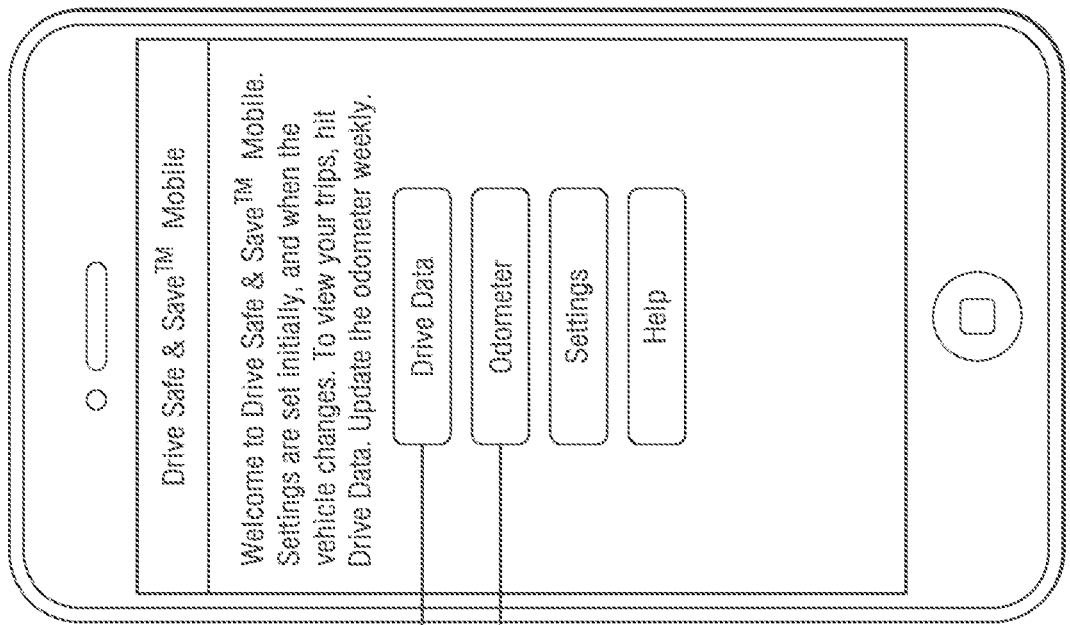
FIG. 11F is a screen shot of a graphic user interface of a Main Menu (Landing Page) screen of a driving analysis application.
Figure 11E:
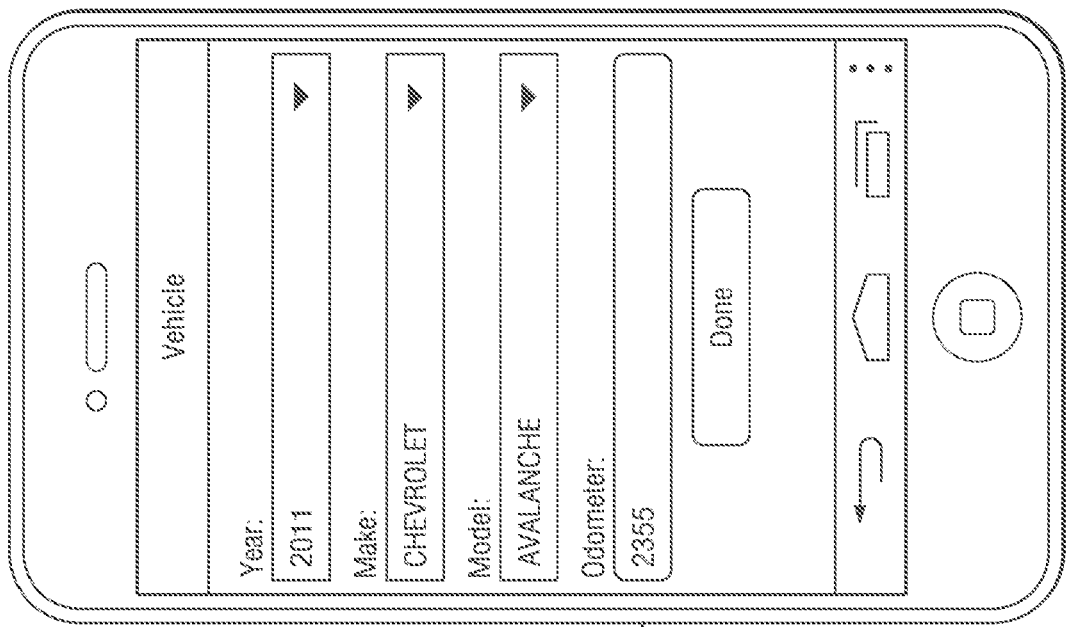
FIG. 11E is a screen shot of a graphic user interface of a Vehicle screen of a driving analysis application.

Turning to FIGS. 11A-11K, example screen shots of the application user interface are provided. FIG. 11A illustrates an user interface for prompting the user to create an account 163, wherein fields are provided for a user ID, password, and zip code. If the user successfully creates an account, the application 50 prompts the user to select Setting to complete registration as shown in FIG. 11B. A Settings tab (see FIG. 11C) allows the user to navigate to a Bluetooth Setup window as shown in FIG. 11D. From this window, the user may select a Bluetooth Settings tab, which will enable the application 50 to cause the mobile device 10 to search for a signal from a vehicle 12 and pair the mobile device 10 to the vehicle 12. After pairing, a Vehicle screen is displayed to the user so that the user is prompted to enter the year, make, model and odometer of the paired vehicle 12, as shown in FIG. 11E. Once paired with the vehicle, registration is complete.

Figure 11H:
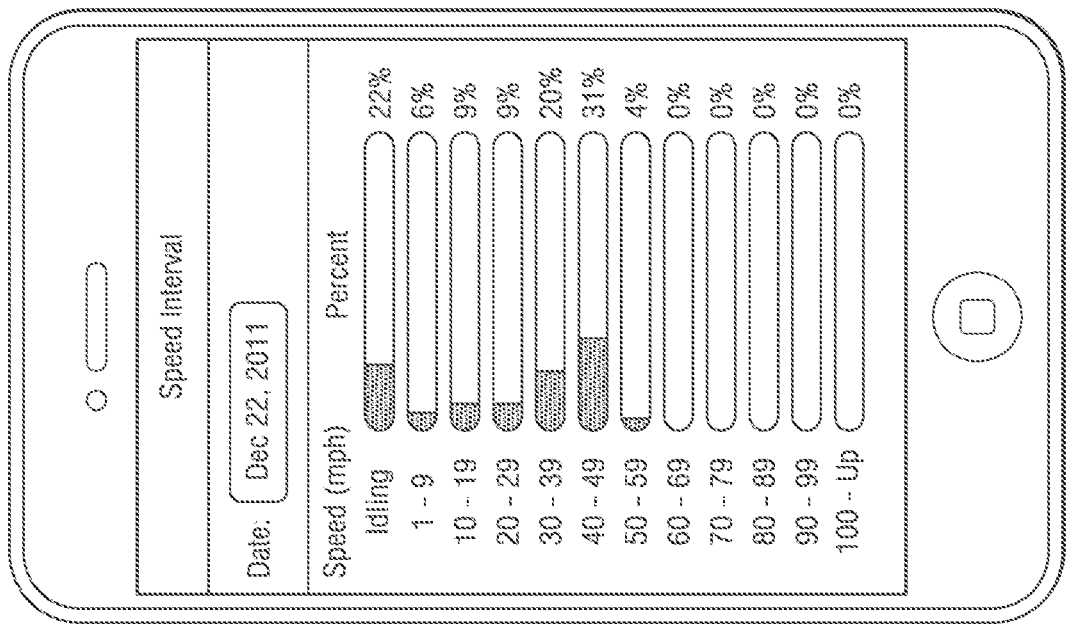
FIG. 11H is a screen shot of a graphic user interface of a Speed Interval screen of a driving analysis application.
Figure 11G:
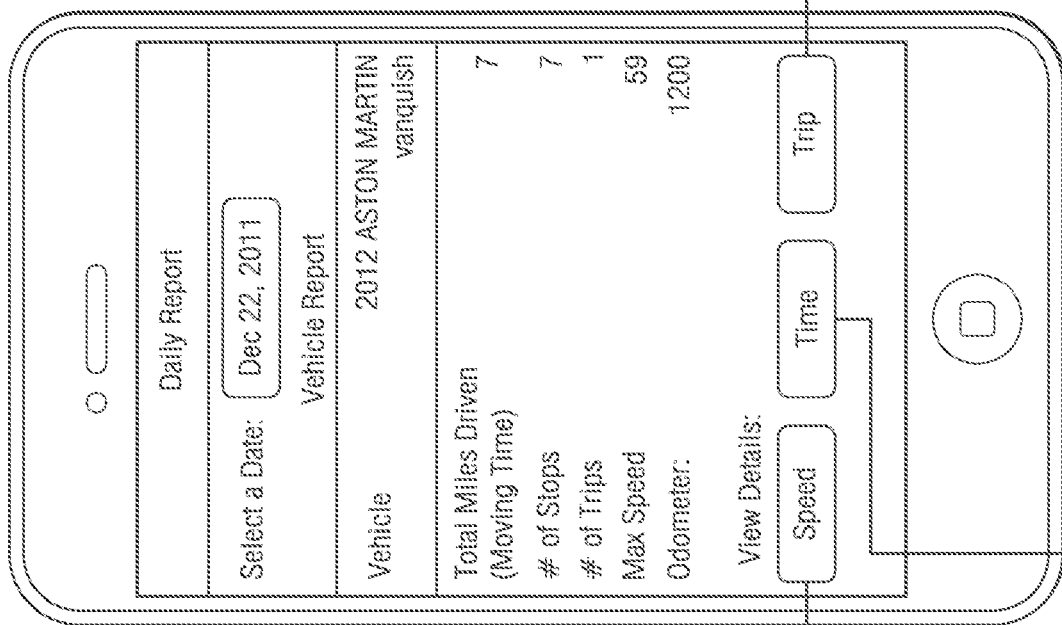
FIG. 11G is a screen shot of a graphic user interface of a Daily Report screen of a driving analysis application.
Figure 11J:
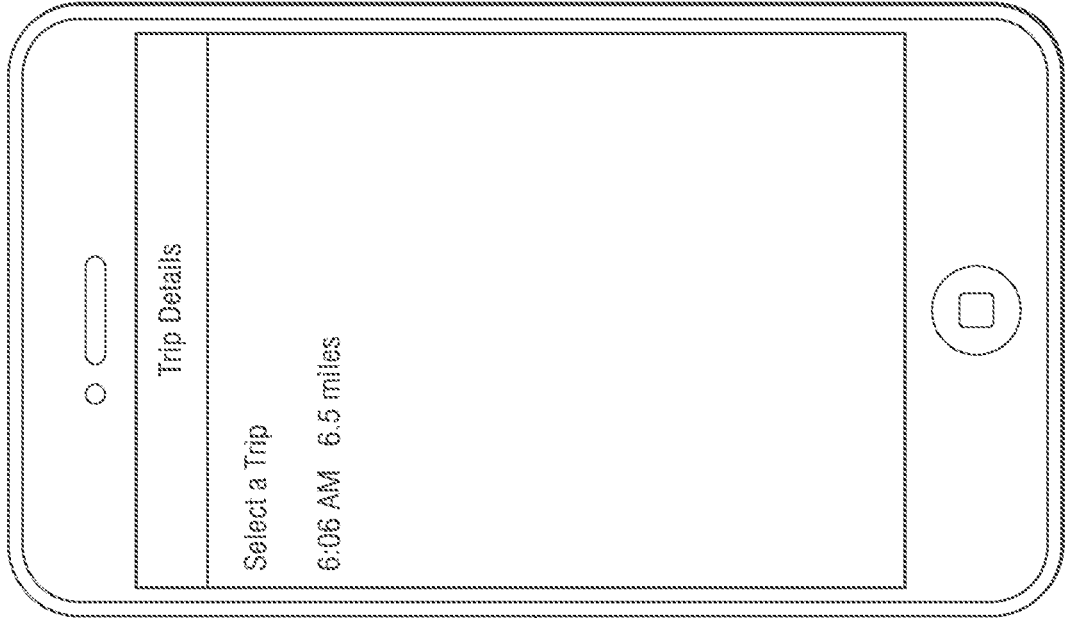
FIG. 11J is a screen shot of a graphic user interface of a Trip Details screen of a driving analysis application.
Figure 11I:
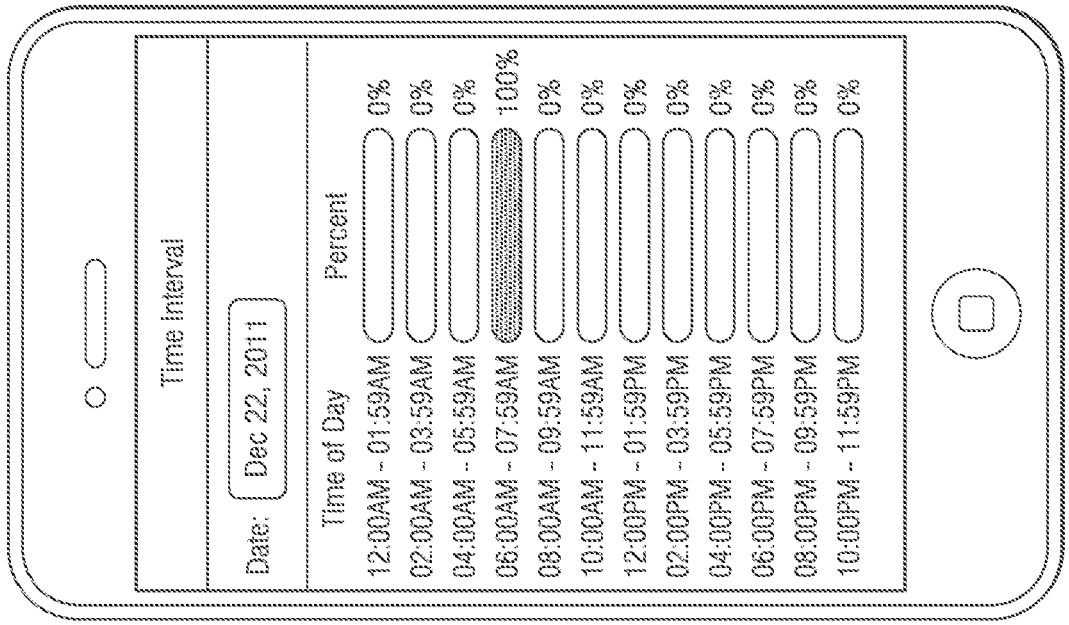
FIG. 11I is a screen shot of a graphic user interface of a Time Interval screen of a driving analysis application.

FIG. 11F shows a screen shot for a main menu (landing page) 164. The user is provided tabs for Drive Data, Odometer, Settings, and Help. The Drive Data tab allows the user to navigate to a Daily Report screen as shown in FIG. 11G. For any given day selectable by the user, the Daily Report identifies the vehicle, provides the total miles driven (moving time), the number of stops, the number of trips, the maximum speed, and the odometer. The Daily Report screen also provides the user three tabs: Speed, Time, and Trip. The Speed tab navigates to a screen as shown in FIG. 11H, which shows speed ranges in increments of 10 miles per hour, for example, and the percent of time the vehicle was operated within each speed range during the day. In this illustration for a vehicle operated on Dec. 22, 2011, the vehicle idled for 22% of the time, was operated between 1-9 mph for 6% of the time, was operated between 10-19 mph for 9% of the time, was operated between 20-29 mph for 9% of the time, was operated between 30-39 mph for 20% of the time, was operated between 40-49 mph for 31% of the time, and was operated between 50-59 mph for 4% of the time. The Time tab shown in FIG. 11G navigates to a screen as shown in FIG. 11I, which provides periods of time during the day and the percent of operation during each time period. In this illustration for a vehicle operated on Dec. 22, 2011, 100% of the operation was between 6:00-7:59 am. The Trip tab shown in FIG. 11G navigates to a screen as shown in FIG. 11J, which provides a listing of trips for the selected date. In this example, only one trip (6:06 AM 6.5 miles) was recorded on the selected day. If the user selects a trip displayed on the screen of FIG. 11J, the application 50 navigates to a map with the trip plotted thereon, as shown in FIG. 11K.

Figure 11L:
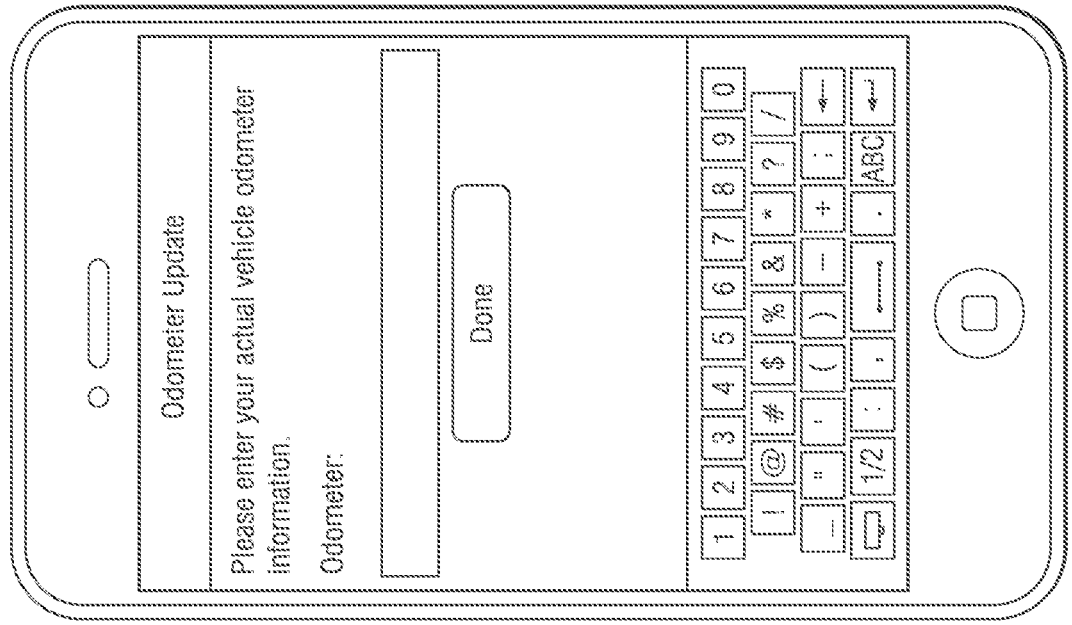
FIG. 11L is a screen shot of a graphic user interface of a Odometer Update screen of a driving analysis application.
Figure 11K:
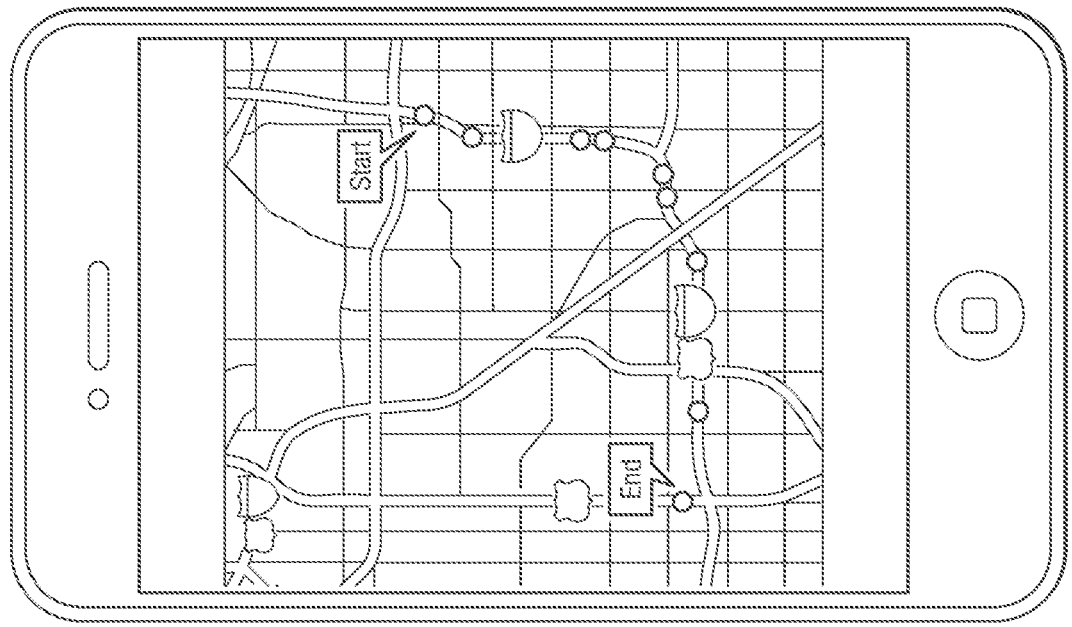
FIG. 11K is a screen shot of a graphic user interface of a Trip Map screen of a driving analysis application.

Referring again to FIG. 11F, if the user selects the Odometer tab from the main menu (landing page) 164, the application navigates to an Odometer Update screen as shown in FIG. 11L. This screen prompts the user to enter the actual vehicle odometer reading.

Figure 12:
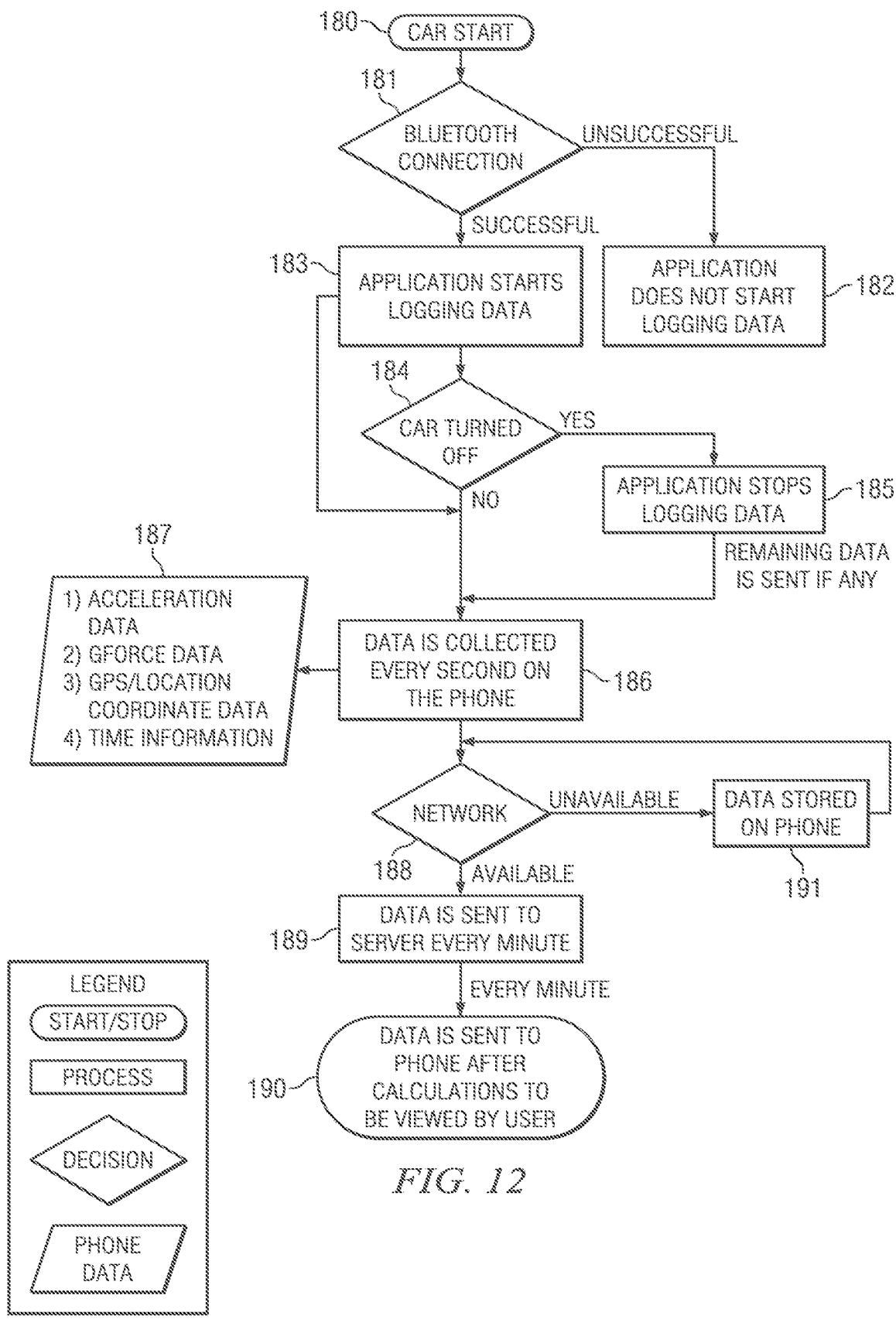
FIG. 12 is a flowchart of a process for collection and analysis of vehicle operation data.

FIG. 12 illustrates a flow chart for the collection and analysis of vehicle use data according to certain embodiments of the invention. When the user starts 180 the engine of the vehicle, a Bluetooth connection is made 181 between the mobile device 10 and the vehicle 12. If the Bluetooth connection is unsuccessful, the application 50 does not start logging data 182. If the Bluetooth connection is successful, the application 50 does start logging data 183. The application 50 will log vehicle use data until the vehicle engine is turned off. The status of the engine is monitored 184 and if the engine is turned off, the application 50 stops logging data 185. Any data collected on the mobile device when the engine is turned off is sent to the server 154 of the remote data storage system 152. As long as the vehicle engine is not turned off, data is collected 186 every second on the mobile device 10. Data collected every second 187 may include: (1) Acceleration Data from accelerometer or sensor used for determining speed, stops, acceleration, and turns; (2) G-force Data for very high speed brakes, hard brakes, smooth brakes, very high speed turns, hard turns, smooth turns, very high speed acceleration, hard acceleration, or smooth acceleration; (3) GPS/Location Coordinate Data used for plotting the route and speed; and (4) Time based information for telling time periods of operation. Data is transmitted 188 from the mobile device 10 to the server 154 of the remote data storage system 152 via a network 144. Every 1 minute of data is sent 189 to the server for backend calculations if the network is readily available. In the case of non availability of network or intermittent availability the data is stored 191 on the mobile device 10 until that batch is sent to the server. It is sent as soon as the network is available on the user's mobile device 10. Data is sent back 190 from the server after calculations for the users Daily Report and also to allow the user to see the data in the terms of the time, trip and speed. When the vehicle is turned off, the application stops logging the data 185, and the remaining data is then sent to the server for calculations at the point of disconnection of the Bluetooth.

While some embodiments of the invention use a Bluetooth pairing between the mobile device 10 and the vehicle 12, any pairing methodology known to persons of skill may be employed. For example, an audio signal may fingerprint the vehicle 12 for the mobile device 10. Radio frequency signals may also be used.

According to different aspects of the invention, software may reside on the mobile device 10 in the application 50 to perform various calculations and manipulation of data, or software may reside on a remote processing computer 150 or a remote data storage system 152 to perform these functions. Depending on the storage and communication capabilities of the mobile device 10, it may be more efficient to perform functions on the mobile device 10 or on the on a remote processing computer 150 or a remote data storage system 152.

A rating engine according to embodiments of the present invention may be used to generate or calculate use-based insurance premiums, which may be applied prospectively or retrospectively. Based on the collected data, a previously paid insurance premium may be adjusted by providing a rebate for low risk driving behaviors or charging a surcharge for high risk driving behaviors. In this retrospective case, the cost of insurance may be the sum of a base premium and the surcharge or rebate. In a prospective case, use data may be collected for a given month and used as a basis to set an insurance premium for a subsequent month.

A rating engine may be used to calculate an insurance premium based on the data collected from the mobile device 10. From the data collected from the mobile device 10, individual factors tending to have predictive power may be isolated and fed into the automated rating engine. The individual factors may be placed in context with other known information about the insured user to increase the predictive power of the automated rating engine to set an appropriate insurance premium for the particular insured user. Insurance premiums are typically calculated based on actuarial classifications, which may be required for underwriting. These classifications may include: vehicle type, vehicle age, user age, user sex, driving history, place of residence, place of employment, traffic violations, vehicle equipment (airbags, antilock breaks, theft control), etc. Data collected from the mobile device 10 may be used to supplement these actuarial classifications to calculate an insurance premium.

The rating engine may employ use-based information from many drivers to identify factors that have greater or less predictive power. As more data is collected on a larger number of vehicle users, over time, the rating engine may be improved to place greater weight on those use factors that tend to have greater predictive power.

The use data collected from vehicles may be inserted into an insurance company's normal data streams to allow the rating engine to calculate insurance premiums based on all available information. Normal billing cycles and processes for communicating premium information to insured users may proceed without disruption as the rating engine proceeds as normal, except that it now incorporates use-based information into the premium calculation.

To encourage vehicle users to register their mobile devices 10 and download the application 50 so as to take advantage of use-based insurance products, wireless service providers may discount service provider premiums in exchange for users registering their mobile devices 10 for use-based insurance. Wireless service providers and carriers currently offer a number of discounts and/or subsidizing programs for phone and data plans. Participants in use-based insurance programs may be offered discounts or subsidized programs relative to their phone or data plans.

Embodiments of the invention may be used in a variety of applications. For example, a driver feedback mobile device could be used to proctor a driver's test for a candidate to obtain a driver's license. It may be used to educate drivers about how to drive in ways that promote better fuel efficiency. The invention may be used to leverage mobile devices to quantify and differentiate an individual's insurance risk base on actual driving behaviors and/or driving environment. The invention may be used to provide data that could be used as a basis to provide a potential customer a quote for insurance. Embodiments of the invention may be used by driver education instructors and systems to educate drivers about safe driving behaviors.

Although the disclosed embodiments are described in detail in the present disclosure, it should be understood that various changes, substitutions and alterations can be made to the embodiments without departing from their spirit and scope.

What is claimed is:

1. A computer-implemented method for collecting and processing vehicle operation data by a mobile device of a user, the method comprising:

during a driving session and while collecting vehicle operation data associated with operation of a vehicle while the vehicle is operating, monitoring, by the mobile device, changes in an orientation of the mobile device relative to the vehicle by:

receiving global positioning system (GPS) data for the vehicle;

comparing the GPS data for the vehicle and mobile device position data collected during the driving session by one or more integrated sensors or devices located in the mobile device;

based on the comparison of the GPS data for the vehicle and the mobile device position data collected by the one or more integrated sensors or devices, automatically determining, by the mobile device, changes in the orientation of the mobile device relative to the vehicle during the driving session and while the vehicle operation data is being collected; and automatically adjusting, by the mobile device, via execution of a compensation algorithm, at least a portion of the collected vehicle operation data based on the determined changes in the orientation of the mobile device relative to the vehicle during the driving session and while the vehicle operation data is being collected to enhance vehicle operation data quality.

2. The computer-implemented method of claim 1, the method comprising:
processing, by the mobile device, the automatically adjusted vehicle operation data; and
wirelessly transmitting the processed automatically adjusted vehicle operation data, by the mobile device, to a remote computer for calculating an insurance premium or otherwise adjusting an insurance policy based on the transmitted processed automatically adjusted vehicle operation data.

3. The computer-implemented method of claim 2, wherein: processing, by the mobile device, the automatically adjusted vehicle operation data comprises
calculating, by the mobile device, one or more driving behavior metrics; and
wirelessly transmitting, by the mobile device, the processed automatically adjusted vehicle operation data to the remote computer comprises wirelessly transmitting, by the mobile device, the calculated one or more driving behavior metrics to the remote computer.

4. The computer-implemented method of claim 2, wherein wirelessly transmitting the processed automatically adjusted vehicle operation data from the mobile device to a remote computer comprises wirelessly transmitting periodically.

5. The computer-implemented method of claim 2, wherein processing, by the mobile device, the automatically adjusted vehicle operation data comprises preparing, by the mobile device, the automatically adjusted vehicle operation data for transmission to the remote computer.

6. The computer-implemented method of claim 1, wherein the mobile device is a device selected from the group consisting of a smartphone, a cell phone, a mobile telephone, a personal digital assistant (PDA), a laptop computer, and a tablet-style computer.

7. The computer-implemented method of claim 1, wherein collecting vehicle operation data by the mobile device comprises sensing, by at least one of the integrated sensors or devices located in the mobile device, a characteristic of the mobile device selected from distance traveled, location, time, and g-force dynamics.

8. The computer-implemented method of claim 1, wherein collecting vehicle operation data by the mobile device comprises collecting vehicle operation data periodically during the driving session.

9. The computer-implemented method of claim 1, further comprising loading a driving analysis application onto the mobile device prior to collecting the vehicle operation data by executing the driving analysis application.

10. The computer-implemented method of claim 1, wherein collecting, by the mobile device, vehicle operation data comprises stopping collection of the vehicle operation data in response to a triggering event selected from vehicle engine stop, threshold vehicle engine RPM, and vehicle immobility.

11. A non-transitory computer-readable storage medium having computer-executable instructions stored thereon, the computer-executable instructions when executed by a processor of a mobile device causes the mobile device to perform operations comprising:
during a driving session and while collecting vehicle operation data associated with operation of a vehicle while the vehicle is operating, monitoring changes in an orientation of the mobile device relative to the vehicle by:
receiving global positioning system (GPS) data for the vehicle;
comparing the GPS data for the vehicle and mobile device position data collected during the driving session by one or more integrated sensors or devices located in the mobile device;
based on the comparison of the GPS data for the vehicle and the mobile device position data collected by the one or more integrated sensors or devices, automatically determining changes in the orientation of the mobile device relative to the vehicle during the driving session and while the vehicle operation data is being collected; and
automatically adjusting via execution of a compensation algorithm, at least a portion of the collected vehicle operation data based on the determined changes in the orientation of the mobile device relative to the vehicle during the driving session and while the vehicle operation data is being collected to enhance vehicle operation data quality.

12. The non-transitory computer-readable storage medium of claim 11, further comprising computer-executable instructions that when executed by the processor cause the mobile device to:
process the automatically adjusted vehicle operation data; and
wirelessly transmit the processed automatically adjusted vehicle operation data to a remote computer for calculating an insurance premium or otherwise adjusting an insurance policy based on the transmitted processed automatically adjusted vehicle operation data.

13. The non-transitory computer-readable storage medium of claim 12, further comprising computer-executable instructions that when executed by the processor cause the mobile device to:
calculate one or more driving behavior metrics; and
wherein to wirelessly transmit the processed automatically adjusted vehicle operation data to the remote computer comprises wirelessly transmitting the calculated one or more driving behavior metrics to the remote computer.

14. The non-transitory computer-readable storage medium of claim 12, wherein to wirelessly transmit the processed automatically adjusted vehicle operation data from the mobile device to a remote computer, the computer-executable instructions cause the mobile device to wirelessly transmit periodically.

15. The non-transitory computer-readable storage medium of claim 12, wherein to process the automatically adjusted vehicle operation data, the computer-executable instructions cause the mobile device to prepare the automatically adjusted vehicle operation data for transmission to the remote computer.

16. The non-transitory computer-readable storage medium of claim 11, wherein the mobile device is a device selected from the group consisting of a smartphone, a cell phone, a mobile telephone, a personal digital assistant (PDA), a laptop computer, and a tablet-style computer.

17. The non-transitory computer-readable storage medium of claim 11, wherein to collect vehicle operation data by the mobile device, the computer-executable instructions cause the mobile device to sense, by at least one of the integrated sensors or devices located in the mobile device, a characteristic of the mobile device selected from distance traveled, location, time, and g-force dynamics.

18. The non-transitory computer-readable storage medium of claim 11, wherein to collect vehicle operation data by the mobile device, the computer-executable instructions cause the mobile device to collect vehicle operation data periodically during the driving session.

19. The non-transitory computer-readable storage medium of claim 11, further comprising computer-executable instructions that when executed by the processor cause the mobile device to load a driving analysis application onto the mobile device prior to collecting the vehicle operation data by executing the driving analysis application.

20. The non-transitory computer-readable storage medium of claim 11, wherein to collect, by the mobile device, vehicle operation data, the computer-executable instructions cause the mobile device to stop collection of the vehicle operation data in response to a triggering event selected from vehicle engine stop, threshold vehicle engine RPM, and vehicle immobility.

\* \* \* \* \*